United States Patent [19]
Dupée et al.

[11] Patent Number: 5,999,255
[45] Date of Patent: Dec. 7, 1999

[54] METHOD AND APPARATUS FOR MEASURING RAMAN SPECTRA AND PHYSICAL PROPERTIES IN-SITU

[75] Inventors: James D. Dupée, London, United Kingdom; Costas Galiotis, Patras, Greece; David L. Davidson, Pace, Fla.

[73] Assignee: Solutia Inc., St. Louis, Mo.

[21] Appl. No.: 09/076,292

[22] Filed: May 11, 1998

Related U.S. Application Data

[60] Provisional application No. 60/061,645, Oct. 9, 1997.

[51] Int. Cl.$^6$ .............................. G01J 3/44; G01N 21/65
[52] U.S. Cl. ............................................................ 356/301
[58] Field of Search ................................. 356/301; 385/12

[56] References Cited

U.S. PATENT DOCUMENTS

| | | | |
|---|---|---|---|
| 5,096,634 | 3/1992 | Tsadares et al. | 264/40.2 |
| 5,112,127 | 5/1992 | Carrabba et al. | 356/301 |
| 5,288,441 | 2/1994 | Collins et al. | 264/40.2 |
| 5,377,004 | 12/1994 | Owen et al. | 356/301 |
| 5,638,172 | 6/1997 | Alsmeyer et al. | 356/301 |
| 5,710,626 | 1/1998 | O'Rourke et al. | 356/301 |

OTHER PUBLICATIONS

Product Bulletin *Induram System Industrial Raman Spectrometer*, (Kaiser Optical Systems, Inc.) (Date Unknown).
*Conformational Change, Chain Orientation, and Crystallinity in Poly(ethylene terephthalate) Yarns: Raman Spectroscopic Study*, Bernard J. Bulkin, Menachem Lewin, and Frank J. DeBlase; Macromolecules, vol. 18 (1985) pp. 2587–2594.
*Crystallinity of poly(tetrafluorethylene) using Raman Spectrosiopy*; R.J. Lehnert P.J. Hendra, and N. Everall; Polymer Communications, vol. 36, No. 12, (1995) pp. 2473–2476.
*Remote Laser Raman Microscopy(ReRaM). 1–Design and Testing of a Confocal Microprobe*; A. Paipetis, C. Vlattas and C. Galiotis; Journal of Raman Spectroscopy, vol. 27 (1996) pp. 519–526.
*A Perspective of the Historical Developments and Future Trends in Raman Microprobe Spectroscopy*; M. Delhaye and P. Dhamelincourt; Microbeam Analysis (1990), pp. 220–226.
*Remote Sampling Using a Fibre–Optic Probe in Fourier Transform Raman Spectroscopy*; K.P.J. Williams, Journal of Raman Spectroscopy, vol. 21, pp. 147–151 (1990).
*The Raman laser fiber optics(RLFO) method and its applications*; Nguyen Quy Dao and Michel Jouan; Sensors and Actuartors B11, (1993) pp. 147–160.
*In situ Raman measurements using a mono–fiber optrode*; Nguyen Quy Dao, M. Jouan, Nguyen Quang Huy, E. Da Silva; Analusis 21 (1993) pp. 219–220.

*Primary Examiner*—F. L. Evans
*Attorney, Agent, or Firm*—Arnold White & Durkee

[57] ABSTRACT

A method for measuring a physical property of a polymer sample includes measuring a portion of a Raman spectrum of the polymer sample, determining a value of a preselected spectral feature from the portion of the Raman spectrum, and comparing the determined value to reference values. The value of the preselected spectral feature depends functionally on the physical property. The reference values relate the preselected spectral feature to the physical property. A probe includes a housing; first, second, and third optical systems attached to the housing; and a first optical filter located along a first direction. The first optical system is to collimate an illumination beam along the first direction. The first optical filter is to produce substantially monochromatic light and is insertable into the probe without substantially affecting an alignment between the probe and the sample. The second optical system is to focus light from the first optical filter on the sample and to collimate scattered light from the sample along a second direction. The third optical system is to focus scattered light from the second direction onto an aperture.

67 Claims, 22 Drawing Sheets

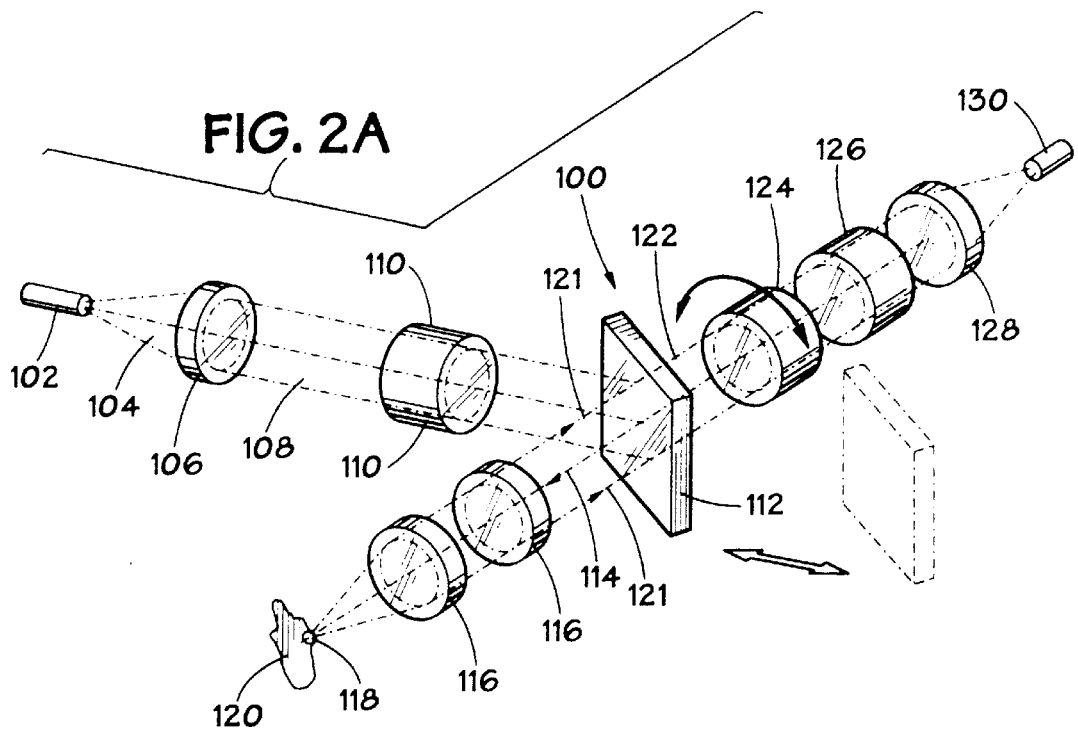
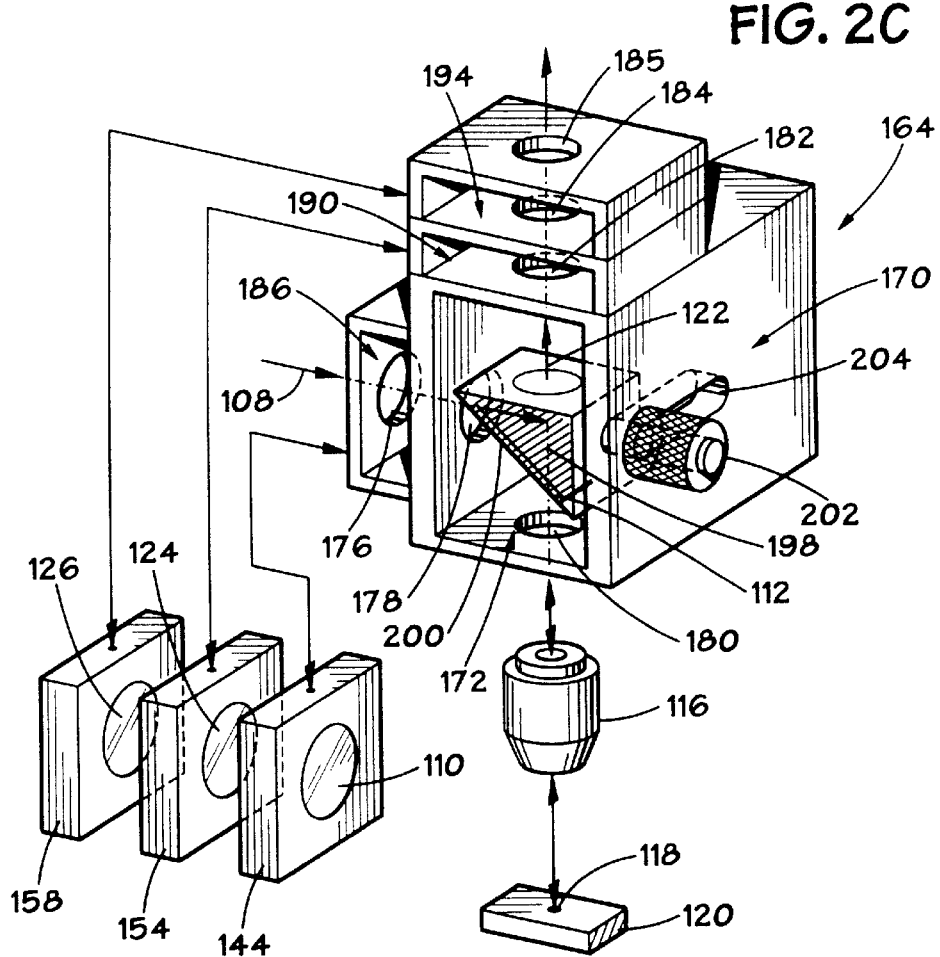

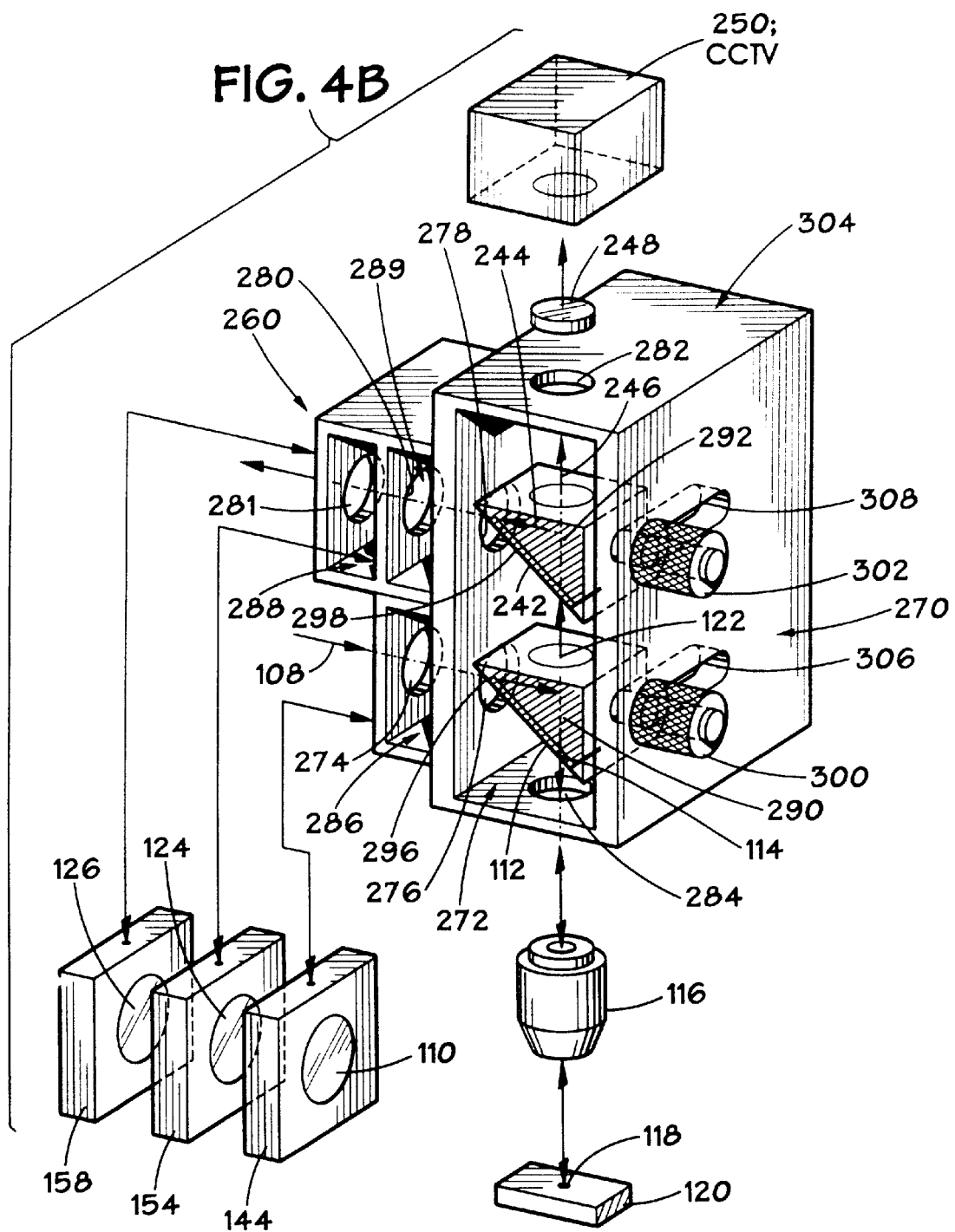

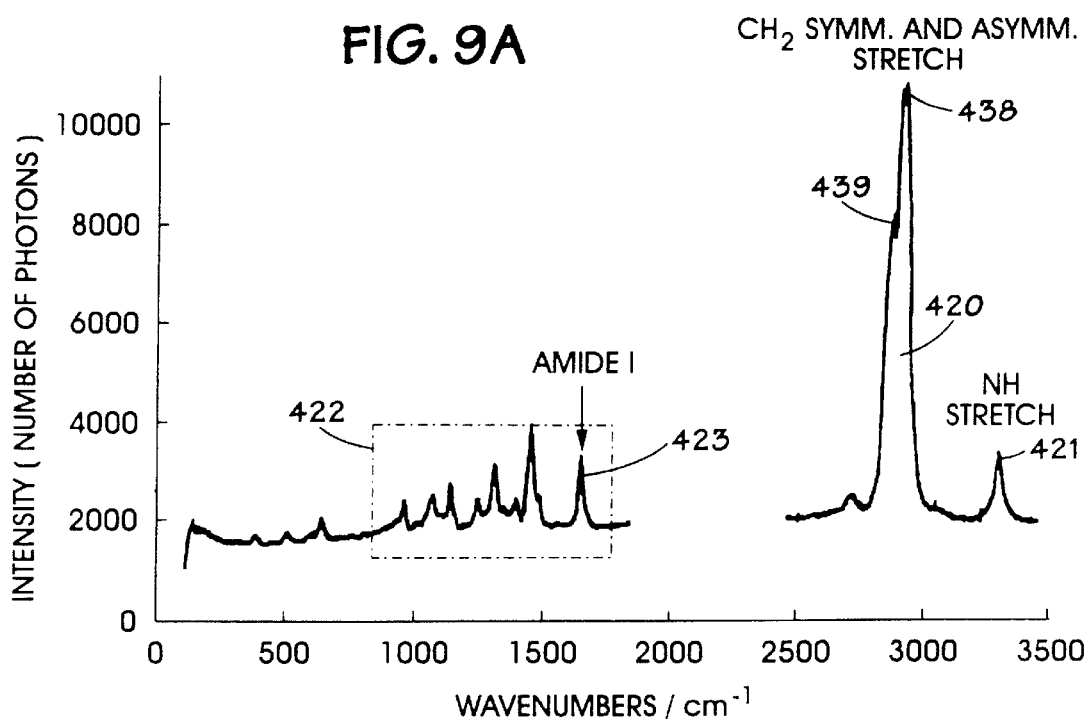
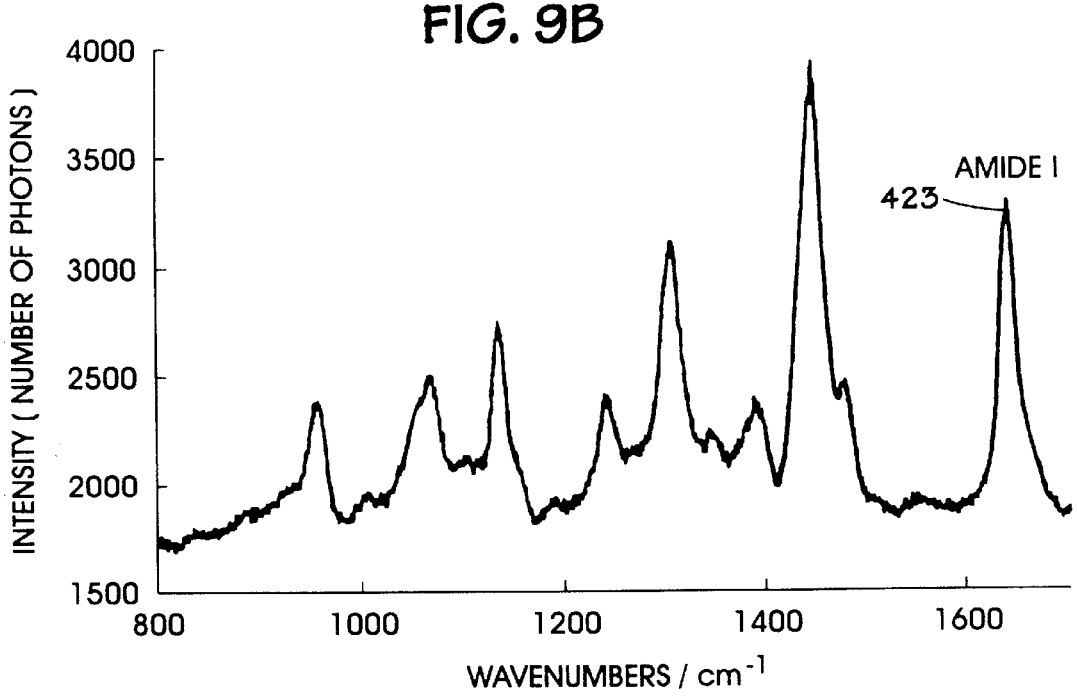

METHOD AND APPARATUS FOR MEASURING RAMAN SPECTRA AND PHYSICAL PROPERTIES IN-SITU

This application claims the benefit of U.S. Provisional Application No. 60/061,645 filed on Oct. 9, 1997.

BACKGROUND OF THE INVENTION

1. Field of the Invention

This invention relates generally to a method and apparatus for measuring Raman spectra and physical properties of polymers, and more particularly, to a method and apparatus for measuring the properties of polymers in-situ.

2. Description of the Related Art

By measuring the physical properties of polymers during the production process, the quality and characteristics of the final product may be more easily monitored and adjusted. The physical properties that may be important to production include crystallinity, temperature, applied stress and orientational state of the polymer. The existing methods for measuring the physical properties of polymers include inherently destructive and non-destructive methods. The destructive methods employ devices that are placed in physical contact with the sample to measure physical properties thereof. For example, the temperature of a polymer sample may be measured by placing a thermocouple in contact with the polymer sample. Methods that use physical contact between the measuring device and a fragile sample involve a high risk of damage to the sample and perturbation of sample properties. The non-destructive methods are based on scattering or absorption of light or other electromagnetic radiation by the polymer sample without placing a measuring device in contact with the sample. The absorption and scattering methods include nuclear magnetic resonance, infrared and optical spectroscopy, birefringence measurements and X-ray diffraction. Unfortunately, the non-destructive methods often employ devices that are not well-suited to the environments encountered in a facility for manufacturing polymers.

FIG. 1 illustrates a device 10 for facilitating the in-situ measurement of Raman or vibrational spectra of a sample 12 in a manufacturing context. The device 10 consists of sensitive apparatus 13 that are preferably located in a protected environment and a remote probe 14 that may be located in the manufacturing environment. The sensitive apparatus 13 include a source 16 for providing the polarized illumination beam 18 that excites Raman scattering. The illumination beam 18 passes through a first optical train 20 that focuses the beam 18 onto a delivery optical fiber 22. The delivery optical fiber 22 is polarization preserving and either a single-modal or a multi-modal fiber. For example, a 10 µm fiber has been used with an Argon ion laser source 16 that produces light with a wavelength of about 514.5 nm. The delivery optical fiber 22 carries the illumination beam 18 from the source 16 to the remote probe 14. A second optical train 24 creates a collimated beam 25 from divergent light leaving the delivery fiber 22. The collimated beam 25 is directed towards a beam splitter 26. The beam splitter 26 reflects a portion of the collimated beam 25 to produce a sample illumination beam 28. The sample illumination beam 28 passes through a third optical train 30 for focusing the beam 28 onto the sample 12. A portion of the light 32 scattered by the sample 12 re-enters the optical train 30 and forms a collimated return beam 33 that intercepts the beam splitter 26. A portion of the return beam 33 is transmitted through the beam splitter 26 and intercepts a removable mirror 34. The return light 35 reflected by the removable mirror 34 intercepts a fourth optical train 36. The optical train 36 focuses the reflected return light 35 onto a first end of a collection optical fiber 38. The collection fiber 38 is a multi-modal fiber, 50 µm or larger that can carry a range of Raman frequencies. When the mirror 34 is removed from the path of the return beam 33, the return beam 33 follows a straight path 40 that intercepts a lens system 41 for focusing light on an optical input of a closed circuit television (CCTV) camera 42. When the mirror 34 is removed, the CCTV camera 42 may be used for white light imagining of the sample 12. The light leaving a second end of the collection fiber 38 is collimated by a fifth optical train 44 before entering a spectrometer 46. A charge coupled device (CCD) 47 changes the collected light into electrical signals that may be further analyzed. The spectrometer 46, e.g., a SPEX 1000M single monochromator, and the CCD 47, e.g., a Wright Instruments air cooled CCD with 300×1200 pixels, are the sensitive devices 13 that are located in a protected environment.

For materials such as polymers, background light can overwhelm the weak light produced by Raman scattering. The prior art device 10 employs a variety of features to increase the Raman scattering light to background light ratio. First, the source 16 is typically a monochromatic source such as a laser. Second, filters 48 and 50 reduce effects due to the Raman activity of the delivery and collection fibers 22 and 38.

If the illumination beam 18 has a wavelength of about 514.5 nm, the spectrum of the collimated beam 18 is mainly broadened by the Strokes Raman shift of fused silica. This broadening is substantially reduced by placing the filter 48 between the output of the delivery fiber 22 and the beam splitter 26. One construction for the filter 48 is a combination of a bandpass filter having an optical density of about 3 and a longpass filter having an edge at about 99 $cm^{-1}$. The return light 33 includes components from both Raman and Rayleigh scattering.

The light from Rayleigh scattering may excite enough Raman activity in the collection fiber 38 to overwhelm the weaker light from Raman scattering by the sample 12. To reduce the Raman activity of the collection fiber 38, a notch filter 50 is placed between the mirror 34 and the collection fiber 38. The notch filter attenuates the source and Rayleigh light.

The two filters 48 and 50 act in combination to eliminate substantially all light from the collection fiber 38 except inelastically scattered light, i.e. Raman scattered light. The result is a Raman spectrum that is substantially independent of the power of the source 16 and primarily limited by electrical noise in the CCD 47.

The sensitivity of the remote probe 14 may be further improved by carefully coupling the optical components. First, the beams 18 and 35 are focused to a spot on the ends of the delivery and collection of fibers 22 and 38, respectively. The spot size is about equal to the diameter of the respective fibers 22 and 38 on which the beams 18 and 35 are incident. The optical trains 20 and 36 control the spot size for the beams 18 and 35, respectively. Second, the Raman excitation of the sample 12 is enhanced by adjusting the optical train 30 to form a focused spot 52 on the sample 12. A x80 Olympus MS Plan ultra-long working distance (4.7 mm) objective can produce a 0.5 µm focused spot 52 on the sample 12. Third, the overall light throughput is improved by increasing the reflectivity of the beam splitter 26 to the collimated beam 25 and by increasing the transparency of the beam splitter 26 to the return beam 33. A holographic beam splitter may be highly reflective to incident light of a preselected wavelength and polarization and he highly transparent to other light. For example, a holographic beam splitter made by Kaiser Optical Systems Inc. of Ann Arbor, Mich. can reflect about 90% of properly polarized light at a wavelength of about 514.5 nm and transmits about 90% of the light at other wavelengths, characteristic of Raman scattering. To increase the reflectivity of the holographic beam splitter 26 an adjustable birefringent device 54 rotates the polarization so that the collimated beam 25 is polarized for optimal reflection. The polarization state selected by the birefringent device 54 is maintained in the polarization preserving delivery fiber 22. Increasing the light throughput through a combination of the above-mentioned devices can be important in applications to weak Raman scatters.

The device 10 of FIG. 1 has several drawbacks in on-line or in-situ applications. First, the device 10 is difficult to externally align, because filter 50 reduces the visibility of the laser light to about 1 part in $10^6$ of the intensity of the focused spot 52 by removing light not coming from Raman scattering. The low visibility of the filtered light beams makes alignment of the fifth optical train 44 with respect to the spectrometer 46 and the charge coupled device 47 difficult. Second, the internal alignment of the optical elements of the device 10 is difficult because of the visibility of the filtered beams 33, 40, and 35 and the fixed attachment of the optical assemblies 24 and 36. Third, the device 10 does not measure polarization dependence of the Raman component of the return light 35. Fourth, the device 10 is not made with off-the-shelf components and thus is rather expensive. Fifth, the remote probe 14 is not simply modified to allow changes to the operating specifications.

The present invention is directed to overcoming, or at least, reducing the effects of one or more of the problems set forth above.

SUMMARY OF THE INVENTION

In a first aspect of the present invention, a method is provided for measuring a physical property of a polymer sample. The method includes measuring a portion of a Raman spectrum of the polymer sample and determining a value of a preselected spectral feature from the portion of the Raman spectrum. The value of the preselected spectral feature depends functionally on the physical property. The method includes comparing the determined value of the preselected spectral feature to reference values. The reference values relate the preselected spectral feature to the physical property.

In a second aspect of the present invention, a probe is provided for measuring a Raman spectrum of a sample. The probe includes a housing and a first optical system for collimating an illumination beam along a first direction. The first optical system is attached to the housing. The probe includes a first optical filter located along the first direction and adapted to produce substantially monochromatic light from light incident thereupon. The first optical filter is insertable into the probe without substantially affecting an alignment between the probe and the sample. The probe includes a second optical system for substantially focusing a portion of the light from the first optical filter on the sample and for substantially collimating a portion of scattered light from the sample along a second direction. The second optical system is attached to the housing. The probe includes a third optical system for substantially focusing a portion of the scattered light from the second direction onto an aperture. The third optical system is attached to the housing.

BRIEF DESCRIPTION OF THE DRAWINGS

Other objects and advantages of the invention will become apparent upon reading the following detailed description and upon reference to the drawings in which:

FIG. 2A illustrates the optical paths of a first embodiment of a remote probe for measuring Raman spectra;

FIG. 2C is a blow-up diagram for a second construction of the Raman probe illustrated by FIG. 2A;

FIG. 4B is a blow-up diagram for a construction of the remote probe illustrated by FIG. 4A;

FIG. 9A illustrates a portion of the Raman spectrum of nylon-66;

FIG. 9B shows the fingerprint region of the Raman spectrum of nylon-66;

Figure 1:
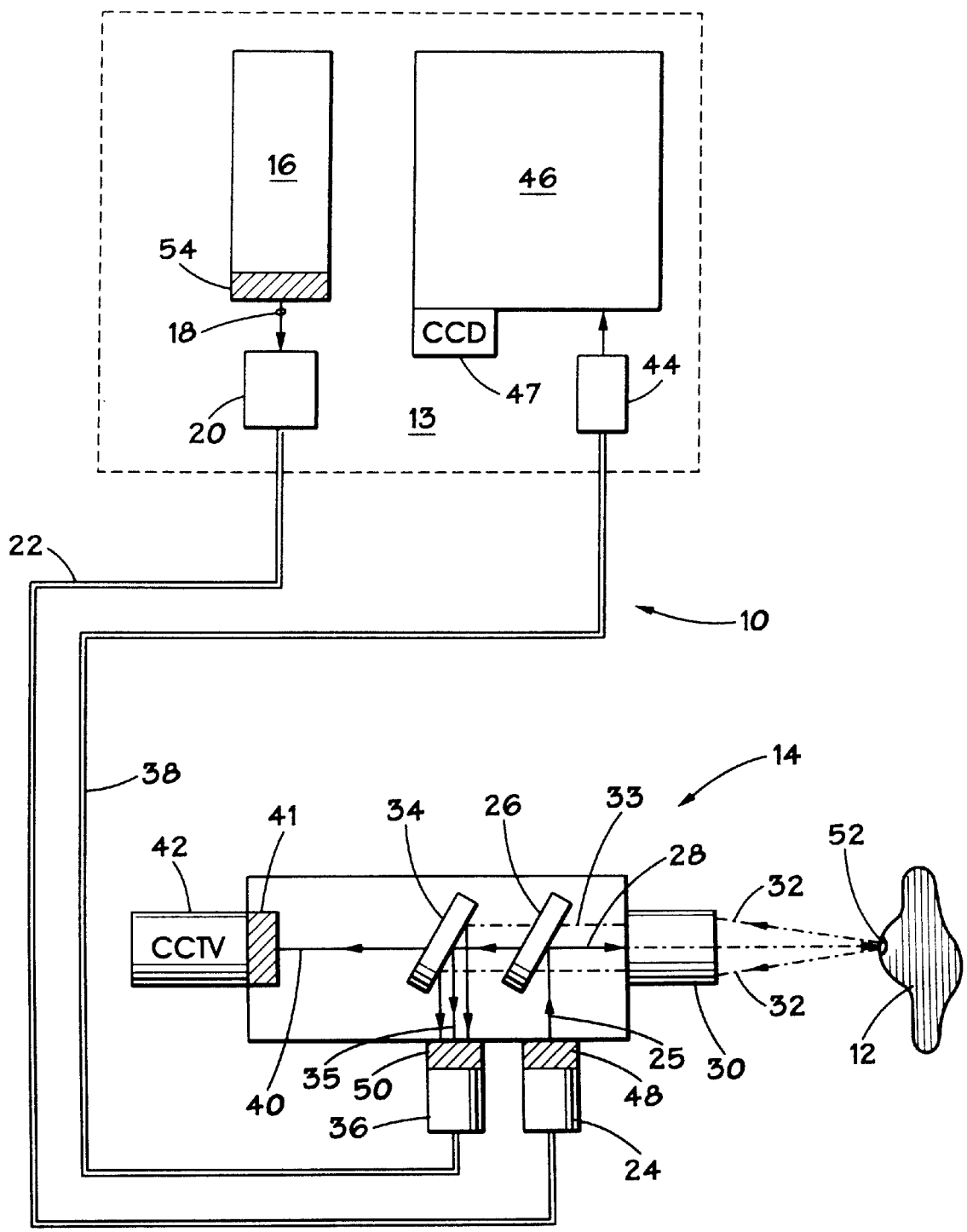
FIG. 1 illustrates a prior art device that employs a remote probe to take Raman spectra.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Specific embodiments include a remote probe, methods for using the probe, and non-destructive methods for measuring the physical properties of polymers in-situ. The embodiments of the remote probe have filters and polarization analyzers that may be removed and inserted without interfering with internal and external alignments. The embodiments for non-destructive methods of measuring the physical properties of polymers can measure a sample's temperature, crystallinity, orientational state, and applied stress from selected features in the sample's Raman spectra. The embodiments for the remote probe and the methods for measuring physical properties are adapted to in-situ measurements under conditions that may, for example occur in a manufacturing facility.

1. Remote Raman Probe

FIG. 2A illustrates the optical paths of a first embodiment of a remote probe 100 for measuring Raman spectra. A delivery optical fiber 102 transports a monochromatic and polarized illumination beam 104 from a source (not shown) to the probe 100. Preferably, the delivery optical fiber 102 is a single-mode polarization-preserving fiber. In one embodiment, the delivery fiber 102 has a diameter of about 10 $\mu$m for a source of light having a wavelength of about 514.5 nm. A first lens system 106 forms a collimated beam 108 from the divergent output beam 104 delivered by the optical fiber 102. The collimated beam 108 passes through a filter 110 that substantially eliminates the wavelength broadening caused by the optical activity of the delivery fiber 102. In specific embodiments, the filter 110 may be a bandpass filter. For example, if the source (not shown) has a wavelength of about 514.5 nm, the spectrum of the collimated beam 108 is mainly broadened by the Strokes Raman shift of fused silica. Then, one construction for the filter 110 is a bandpass filter with an optical density of about 3.

After the filter 110, the collimated beam 108 intercepts a beam splitter 112. Preferably, the beam splitter 112 has a high reflectivity. Some embodiments employ a beam splitter that reflects about 50 percent of the incident light, e.g. a dichroic or 50/50 beam splitter. Other embodiments use a holographic beam splitter that reflects a higher percentage of the collimated beam 108. For example one holographic beam splitter of Kaiser Optical Systems, Inc. can reflect about 90 percent of properly polarized light at 514.5 nm. The optical fiber 102 and source may be aligned to deliver the beam 108 polarized in a direction that optimizes reflection off a polarization and/or wavelength sensitive beam splitter.

After the beam splitter 112, a reflected beam 114 passes through a second lens system 116 that focuses the beam 114 to a spot 118 on the sample 120. Some embodiments use an infinity corrected microscope objective for the second lens system 116. e.g.. Olympus x20 or x80 ultra-long working distance objectives having focal lengths of about 14 mm and 4.7 mm, respectively. The numerical aperture. e.g. about 0.4 and 0.75 for the above-mentioned Olympus objectives, of the second lens system 116 also serves to collect a portion of the returning light scattered by the sample 120.

The returning light repasses through the second lens system 116 to form a collimated return beam 121 that intercepts the beam splitter 112. Since the return beam 121 ordinarily has a different band of wavelengths than the collimated beam 108, e.g., wavelengths longer than 514.5 nm, a substantial beam 122 is transmitted if the beam splitter 1 12 is wavelength and polarization selective. For example, the above-mentioned holographic beam splitter of Kaiser Optical Systems. Inc. transmits about 90 percent of the light at wavelengths other than 514.5 nm. The transmitted beam 122 passes through a rotatable analyzer 124 that may be used to analyze the polarization of the return beam 121. The transmitted beam 122 also passes through a notch filter 126. The notch filter 126 is centered on the Raman wavelengths of interest and is constructed to substantially eliminate broad band light coining from Rayleigh scattering off the sample 120. In specific embodiments, the order of the analyzer 124 and the notch filter 126 may be reversed. After the analyzer 124 and the notch filter 126, a third lens system 128 focuses the beam onto a first end of a collection optical fiber 130. Ordinarily, the collection fiber 130 is a multi-modal optical fiber that can carry light over the whole frequency range of the Raman spectrum of interest, e.g., a fiber at least about 50 $\mu$m wide and about 200 $\mu$m wide in one embodiment. The collection fiber 130 does not have to be polarization preserving. Nevertheless, the probe 100 can perform polarization sensitive measurements of Raman spectra.

FIG. 213 is a blow-up view of a first embodiment 131 for the probe illustrated in FIG. 2A. The probe 131 has a hollow main housing 132 with a plurality of ports 134, 135, 136, and 137 situated along x- and y- axes. The modular assemblies 116, 138, 139, and 140 may be bought off-the-shelf and removably attached to the main housing 132 via the ports 135, 134, 136, and 137, respectively. The first assembly 138 has a plurality of externally adjustable 4-point micro-positioners 141 for fixing the first lens system 106 to the assembly 138 and for facilitating adjustments of internal optical alignments. In some embodiments, the 4-point micro-positioners are modified by replacing positioning screws with micrometer threads. The replacement enables more accurate alignment adjustments. The first assembly 138 has a slot 142. The slot allows for slidably inserting or removing an assembly 144 comprising the filter 110, i.e. ordinarily a bandpass filter, without otherwise disturbing the external or internal alignments of the probe 131. The second lens system 116 connects to the second port 135 of the main housing 132 and functions to focus the reflected beam 114 to the small spot 118 on the sample 120. The above-mentioned Olympus microscope objectives may be easily interchanged to change the specifications of the probe 131. The third assembly 139 also has 4-point micro-positioners 148 for fixing the launch tube 128, i.e. a focusing lens and holder for the optical fiber 130 to the assembly 139 and for facilitating internal alignments of the third lens system 128 with the beam splitter 112 and the second lens system 116. The 4-point micro-positioners 148 are substantially identical to the 4-point micro-positioners 141 employed to position the first lens system 106.

The third assembly 139 has first and second slots 150 and 152. The first slot 150 holds a slidably removable assembly 154 for the polarizer analyzer 124. A moveable lever 156 enables rotating the reference direction of the analyzer 124 to perform polarization measurements. In some embodiments, the first slot 150 and polarization analyzer 124 are absent. The second slot 152 slidably holds a second assembly 158 for the notch filter 126 that reduces light coming from Rayleigh scattering off the sample 120. In some embodiments, the order of the analyzer 124 and the notch filter 126 is inverted, i.e. the assemblies 154 and 158 are held by the slots 152 and 150, respectively. The fourth assembly 140 slidably inserts into the fourth port 137 and rigidly holds the beam splitter 112.

The removable modular assemblies 138, 139, and 140, the second optical system 116, and the filtering 144 and 158 are easily interchanged. These devices are off-the-shelf elements. They may be inexpensively interchanged to change the operating specifications of the probe 131.

The removable elements facilitate aligning various optical elements of the probe 131 internally and aligning the probe 131 externally with respect to the sample 120. First, for aligning the third lens system 128 with respect to the second lens system 116, the assembly 140 may be removed from the optical path. The collection fiber 130 may be used as an illumination source during the alignment procedure. Second, for aligning the probe 131 externally with respect to the sample 120, the filter assemblies 144 and/or 158 and the analyzer assembly 154 may be removed. Removing these elements improves the visibility of the spot 118 on the sample 120 thereby making the alignment simpler to perform. After the probe 131 is aligned on the sample 120, the filter assemblies 144 and 158 and the analyzer assembly 154 may be slid into the slots 142, 152, and 150 without substantially disturbing the alignment. By removing the assemblies 144, 154, 158, and/or 140, the visibility of the light beams inside and outside the probe 131 is enhanced for the alignment operations.

Figure 2B:
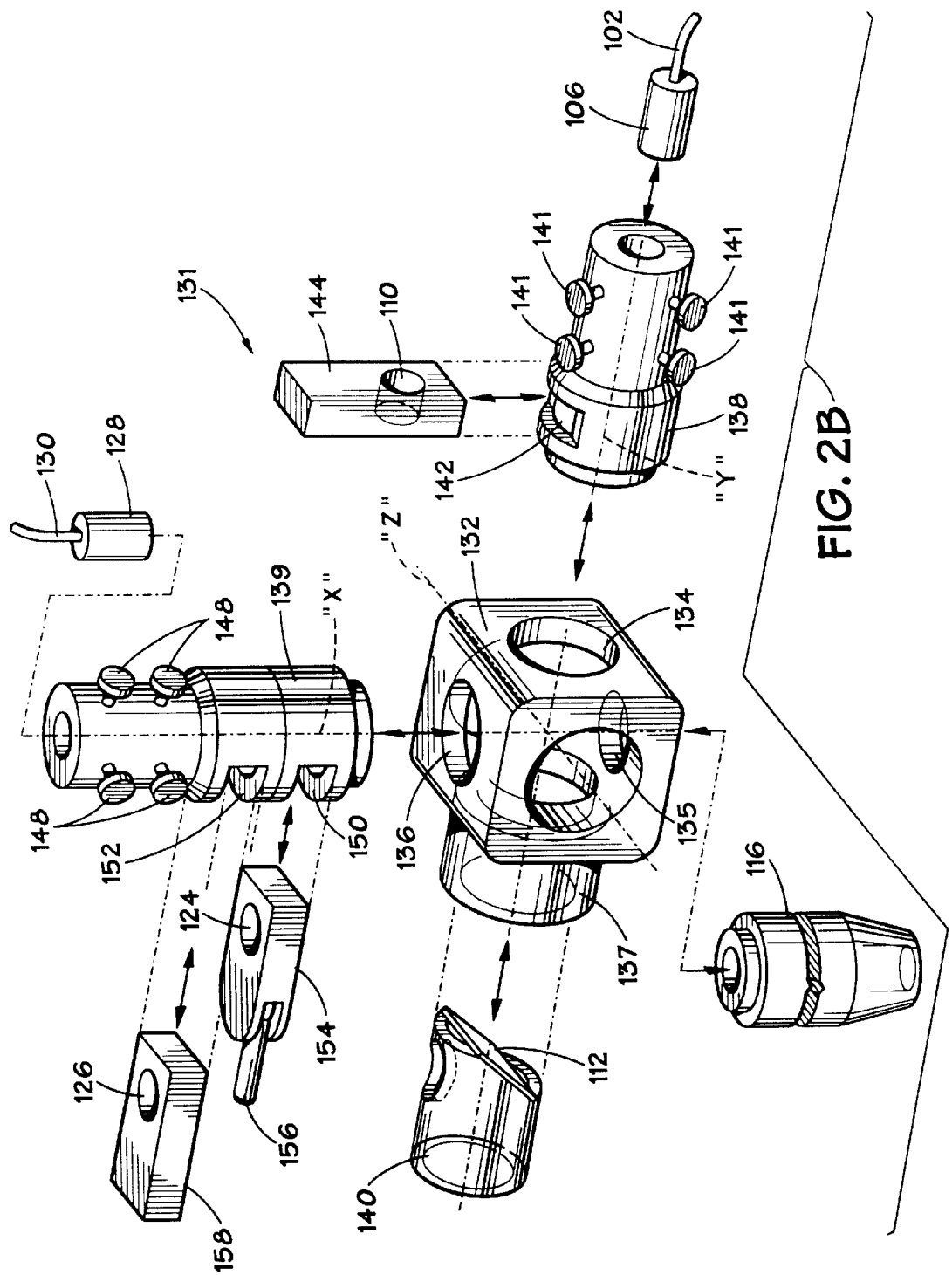
FIG. 2B is a blow-up diagram for a first construction of the Raman probe illustrated by FIG. 2A.

FIG. 2C is a blow-up of a second embodiment of the probe illustrated in FIG. 2A. The probe 164 includes rectangular housing 170 having a hollow cavity 172 and a plurality of aligned ports 176, 178, 180, 182, 184, and 185. The modular assembly 138 of FIG. 2B for holding the first lens system 106 of FIG. 2B attaches to the first port 176. The second lens system 116, e.g., one of the above-mentioned microscope objectives, attaches to the third port 180. The modular assembly 139 of FIG. 2B for holding the third lens system 128 of FIG. 2B attaches to the sixth port 185. The first two ports 176 and 178 open an optical access to a rectangular cavity 186 for slidably holding the assembly 144 for the filter 110. The fourth and fifth ports 182 and 184 open an optical access to a second rectangular cavity 190 for slidably holding the assembly 154 for the analyzer 124. In some embodiments, the second rectangular cavity 190 and the analyzer 124 are absent. The fifth and sixth ports 184 and 185 open an optical access to a third rectangular cavity 194 for slidably holding the assembly 158 for the notch filter 126. The hollow cavity 172 of the rectangular housing 170 holds a wedge-shaped cube 198. The beam splitter 112 is rigidly fixed to an angled surface 200 of the wedge-shaped cube 198. The wedge-shaped cube 198 attaches to the rectangular housing 170 by a removable retaining screw 202.

Several features of the probe 164 aid in alignment procedures therewith. First, by loosening the screw 202 and sliding the wedge along the slot 204, the wedge-shaped cube 198 may be removed from the beam paths. Removing the wedge-shaped cube 198 from the beam paths aids during the alignment of the third and second lens systems 128 and 116, respectively. Second, the filter assemblies 144 and 158 and the analyzer assembly 154 may be removed from the probe 164 during alignment and then slid back into the cavities 176, 194, and 190 without substantially disturbing the alignments. Removing the filters 110, 126 and the analyzer 124 during the alignment process increases the visibility of the spot 118 on the sample 120 and the visibility of light beams inside and outside the probe 164.

The lens systems 106, 116, and 128; and the filter assemblies 144 and 158 are off-the-shelf devices. These devices may be inexpensively changed to modify the operating specifications of the probe 164.

FIGS. 2B and 2C illustrate the use of a microscopic objective for the second lens system 116. A microscope objective focuses the reflected beam 114 to a small spot 118 e.g., less than 1 $\mu$m, on the sample 120. Nevertheless, a microscope objective has a short focal length. The short focal length necessitates placing the probe 131 or 164 very close to the sample 120.

Figure 3:
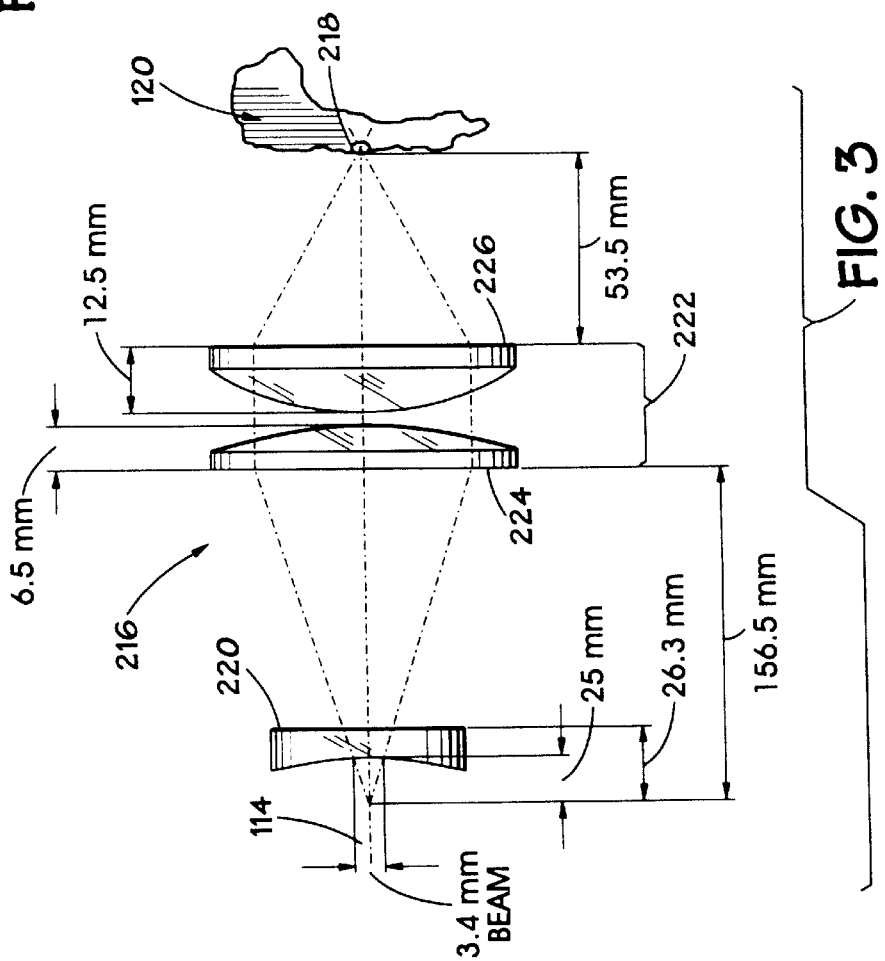
FIG. 3 is an alternate embodiment for the lens system of the remote probe of FIG. 2A that focuses the sample illumination beam.

FIG. 3 illustrates an alternate device 216 for the second lens system 116. The device 216 allows the probe 131 or 164 to be farther from the sample 120. The illustrated device 216 produces a larger spot 218 with a diameter of about 30 $\mu$m. The sample 120 is about 53.5 mm from the second lens system 116, and the entering reflected beam 114 has a diameter of about 3.4 mm.

The device 216 includes a concave lens 220 having a focal length of about 25 mm and an achromatic doublet 222 consisting of two convex lenses 224 and 226 with focal lengths of about 160 mm and 60 mm, respectively. The two convex lenses 224 and 226 have a center to center separation of about 9.5 to 10 mm. The center of the achromatic doublet 222 is about 140.4 mm from the concave lens 220. The concave lens 220 acts like the beam expander of a Galilean telescope, and the doublet 222 focuses the expanded beam to the spot 218.

Lens systems that allow placing the remote probe 131 or 164 farther from the sample 120 have two drawbacks. First, as FIG. 3 illustrates, the focused spot 218 is generally larger on the more the distant sample 120. Second, the aperture of the second lens system 116 ordinarily subtends a smaller solid angle reducing the amount of scattered light collected. The particular choice for the second lens system 116 is not critical to the present invention and may be based on application specific considerations.

Figure 4A:
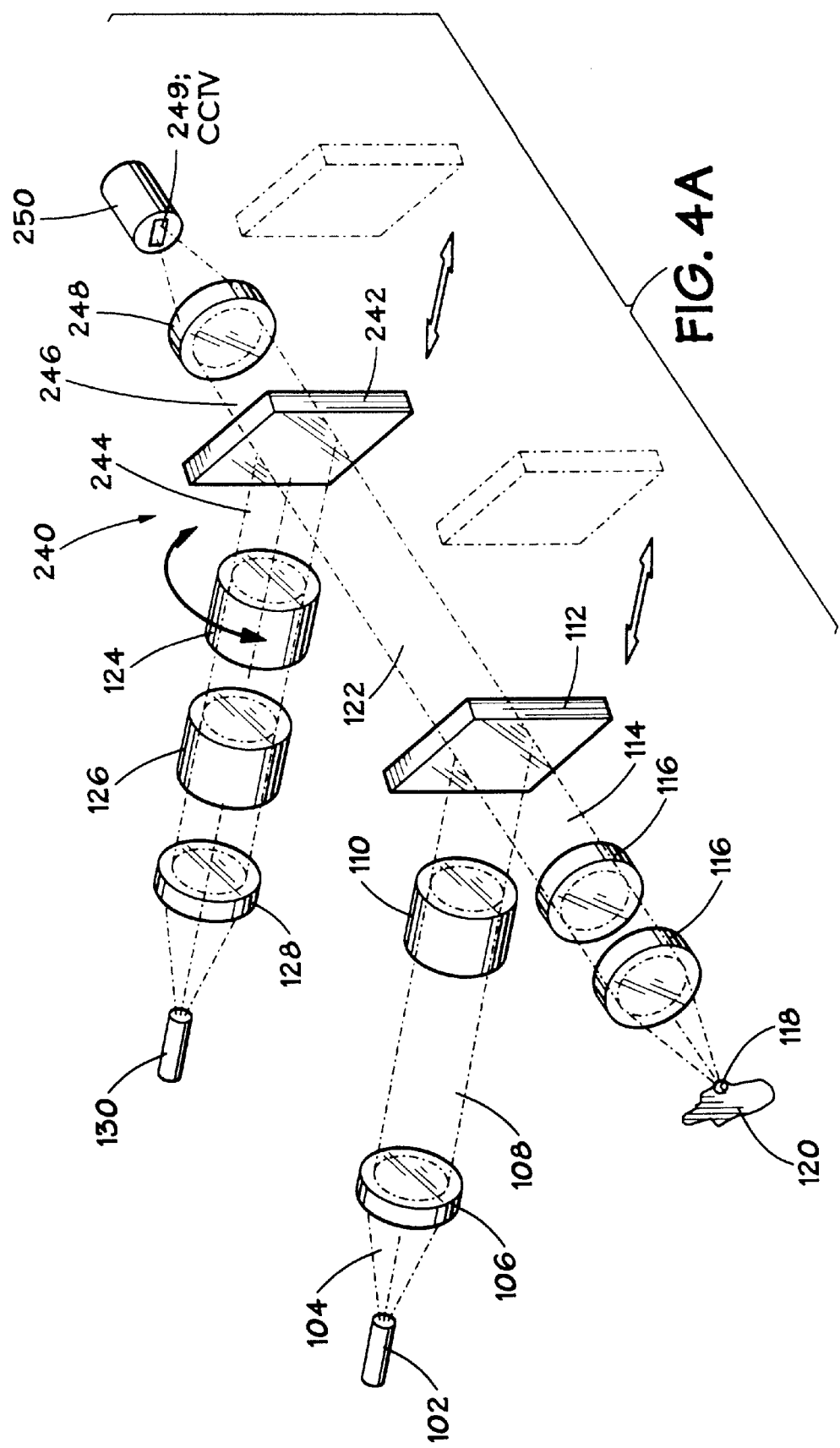
FIG. 4A illustrates the optical paths of a second embodiment of a remote probe for measuring Raman spectra.

FIG. 4A illustrates the optical paths of a second embodiment of a probe for measuring Raman spectra. The delivery optical elements and beams 102, 104, 106, 108, 110, 112, 114, 116, and 122 are substantially the same in the embodiments 100 and 240 of FIGS. 2A and 4A, respectively. The transmitted beam 122 intercepts a partially reflecting and partially transmitting mirror 242, e.g., a 99 percent reflecting mirror. In some embodiments, the partial mirror 242 is replaced by a beam splitter (not shown). A reflected beam 244 enters a collection optical train substantially identical to the train of optical elements 124, 126, 128, and 130 encountered by the transmitted beam 122 of FIG. 2A. In FIG. 4A, a second beam 246 is transmitted through the partial mirror 242 and focused by a fourth lens system 248 onto an aperture 249 of a closed circuit television (CCTV) camera 250. The CCTV camera 250 provides an image of the sample 120. The image from the CCTV 250 has an enhanced intensity, because the second beam 246 does not pass through the notch filter 126 or the analyzer 124. The image of the sample 120 produced by the CCTV camera 250 may be used to align the spot 118 and to correct for movements of the sample during actual operation.

FIG. 4B is a blow-up diagram of an embodiment of the probe illustrated in FIG. 4A. The probe 260 includes a rectangular housing 270 having a hollow cavity 272 and a plurality of ports 274, 276, 278, 280, 281, 282, and 284. The modular assembly 138 of FIG. 2B (not shown) for fixing and for adjusting the alignment of the first lens system 106 (not shown), attaches to the first port 274. The modular assembly 139 of FIG. 2B (not shown) for fixing and for adjusting the alignment of the third lens system 128 (not shown) attaches to the fifth port 281. The first pair of ports 274 and 276 and the third pair of ports 280 and 281 open up optical accesses to rectangular cavities 286 and 288 respectively. The rectangular assemblies 144 and 158 for the filters 110 and 126 may be slid into the first and third rectangular cavities 286 and 288, respectively. The second pair of ports 280 and 278 opens an optical access to a second rectangular cavity 289. The second rectangular cavity 289 slidably holds the assembly 154 for the analyzer 124. In some embodiments, the third cavity 289 and the analyzer 124 are absent. The hollow cavity 272 of the rectangular housing 270 holds two wedge-shaped cubes 290 and 292. The beam splitter 112 and the partial mirror 242 of FIG. 4A rigidly attach to the respective angled surfaces 296 and 298 of the wedge-shaped cubes 290 and 292, respectively. The wedge-shaped cubes 290 and 292 are slidably attached to the housing 270 by screws 300 and 302. The beam 246 transmitted by the partial mirror 242 intercepts the fourth lens system 248. The fourth lens system 248 attaches to the sixth port 282 of the rectangular housing 270 by an assembly (not shown). The CCTV camera 250 is attached to the upper surface 304. Light from the fourth lens system 248 is focused on the aperture 249, shown in FIG. 4A, of the CCTV 250. The rectangular probe 260 functions similarly to the rectangular probe 164 of FIG. 2C, but the probe 260 has additional image forming capability provided by the CCTV camera 250.

Several features of the probe 260 aid in alignment procedures. First, each of the wedged-shaped cubes 290 and 292 may be independently removed from the beam path by loosening the respective retaining screw 300 or 302 and then sliding the respective wedge 290 or 292 along the slot 306 or 308. Removing the beam splitter 112 and/or the partial mirror 242 from the beam path facilitates the alignment of the first and third lens systems 106 and 128 of FIG. 2B and of the CCTV camera 250 with respect to the second lens system 116. Second, the filter and analyzer assemblies 144, 158 and 154 may be removed during external and internal alignments of the probe 260 and then slid back into the cavities 286, 288, and 289 without substantially disturbing alignments. Removing the filters 144 and 158 and the analyzer 154 increases the visibility of the spot 118 on the sample 120 and of light beams inside and outside the probe 260 during alignments. Third, the CCTV camera 250 may be employed to adjust the external alignment of the probe 260 with respect to the sample 120 during operation, e.g., to correct for motion of the sample 120 on-line.

As mentioned above, the assemblies 138 and 139 of FIG. 2B for holding the first and third lens systems 106 and 128 have micro-positioners that facilitate alignment adjustments. The assemblies for the lens systems 106, 116, and 128; the filter assemblies 144 and 158 are off-the-shelf devices that may be inexpensively interchanged to change the operating specifications of the remote probe 260.

Figure 5A:
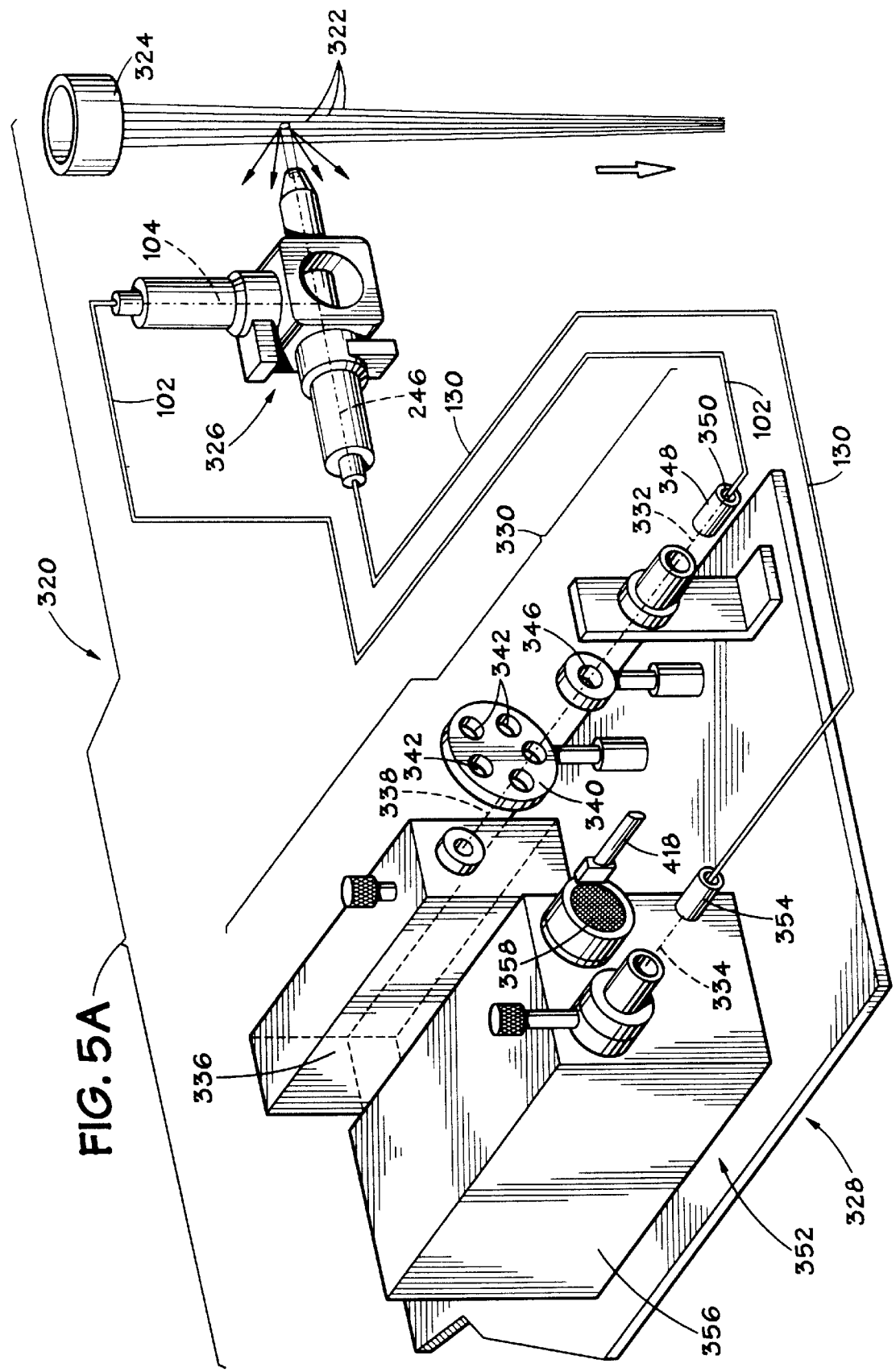
FIG. 5A illustrates an embodiment for a remote probe and an optical bench setup that performs in-situ Raman measurements.

FIG. 5A illustrates a device 320 for measuring the Raman spectrum of polymer fibers 322 in-situ. e.g., nylon fibers 322 leaving an industrial spinneret 324. The device 320 includes two pieces. The first piece is the remote probe 326, i.e. one of the probes 131, 164, or 260 illustrated in FIGS. 2B, 2C and 4B. The second piece is an optical bench setup 328 connected to the remote probe 326 by the delivery and collection optical fibers 102 and 130, respectively. The remote probe 326 is typically close to the polymer fibers 322 under observation and may be at a distance of between 0 and about 100 meters from the optical bench setup 328. The optical bench setup 328 comprises an optical train 330 for producing the source beam 332 and an analyzing system 352 for producing a Raman spectrum from light 334 returned by the collection fiber 130. The remote probe 326 may be mounted on a frame (not shown) that enables movements and rotations facilitating the observation of the different fibers 322 and the observation of the same fiber 322 at different distances from the spinneret 324.

The optical train 330 for producing the source beam 332 comprises a laser 336 that produces a monochromatic polarized beam 338, e.g., an Argon ion laser operating in a single mode to produce a beam having a wavelength of about 514.5 nm, a density filter wheel 340 having windows 342 of different optical density for reducing the intensity of the laser beam 338, a birefringent slab 346 for rotating the polarization of the laser beam 338 to maximize reflection by the beam splitter 112 (not shown) of the probe 326, and a launching optical train 348 for focusing the source beam 332 onto the end 350 of the delivery optical fiber 102.

The analyzing system 352 comprises a spectrometer 356, e.g., a SPEX 1000M single monochromator and a charge coupled device (CCD) 358 for converting the optical signal into an electrical signal, e.g., a Wright Instruments Thermo Electric cooled CCD having 300×1200 pixels. The analyzing system 352 also includes a lens system 354 matched to the numerical aperture of the spectrometer 356 to focus the light 334 from the collection optical fiber 130 onto the optical input of the spectrometer 356. In some embodiments, additional electrical devices (not shown) further process the electrical output signal from the CCD 358. Other embodiments may use different analyzing systems that would be routine to implement by persons of ordinary skill in the art having the knowledge of the present disclosure.

Figure 5B:
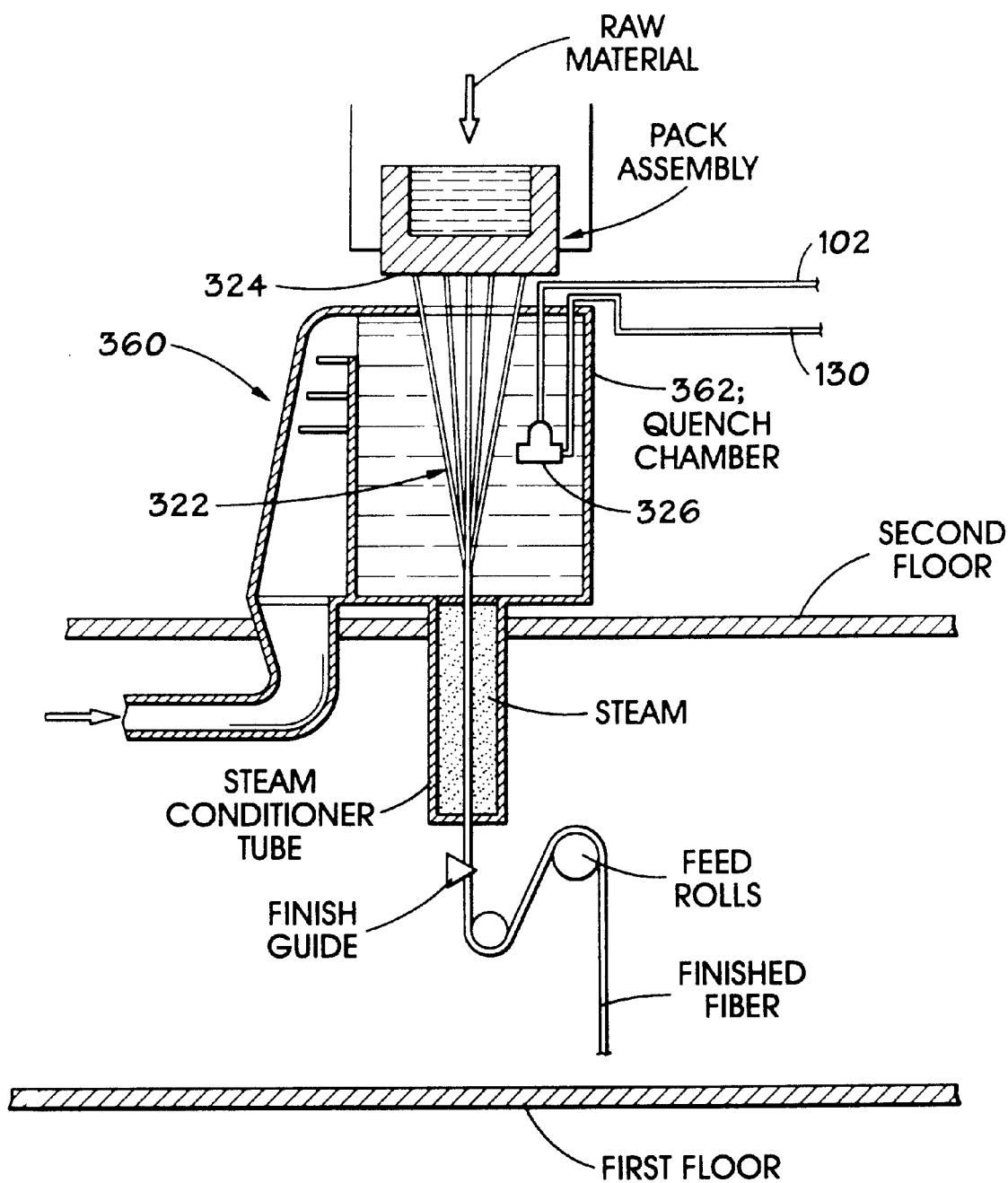
FIG. 5B illustrates a portion of and industrial facility in which the remote probe of FIG. 2B, 2C, or 4B may be used to measure the Raman spectrum of polymer fibers during manufacture.

FIG. 5B shows a portion of an industrial facility 360 in which the device 320 and the remote probe 326 are employed to measure the Raman spectra of the nylon fibers 322 in manufacture. The remote probe 326 may be located at any position along the manufacturing line where the operator desires data on the Raman spectra of the polymer fibers 322. For example, the remote probe 326 may be positioned to observe the fibers 322 inside the quench chamber 362 at various distances along the fibers 322 from the face of the spinneret 324. The optical bench setup 328 may be placed at a distant location that is isolated from vibrations, elevated temperatures and reagents inherent to the manufacturing portion of the industrial facility 360. While the present application is to the industrial facility 360, the scope of the invention is intended to cover uses of the probe 326 in other situations as defined by the claims.

Figure 6:
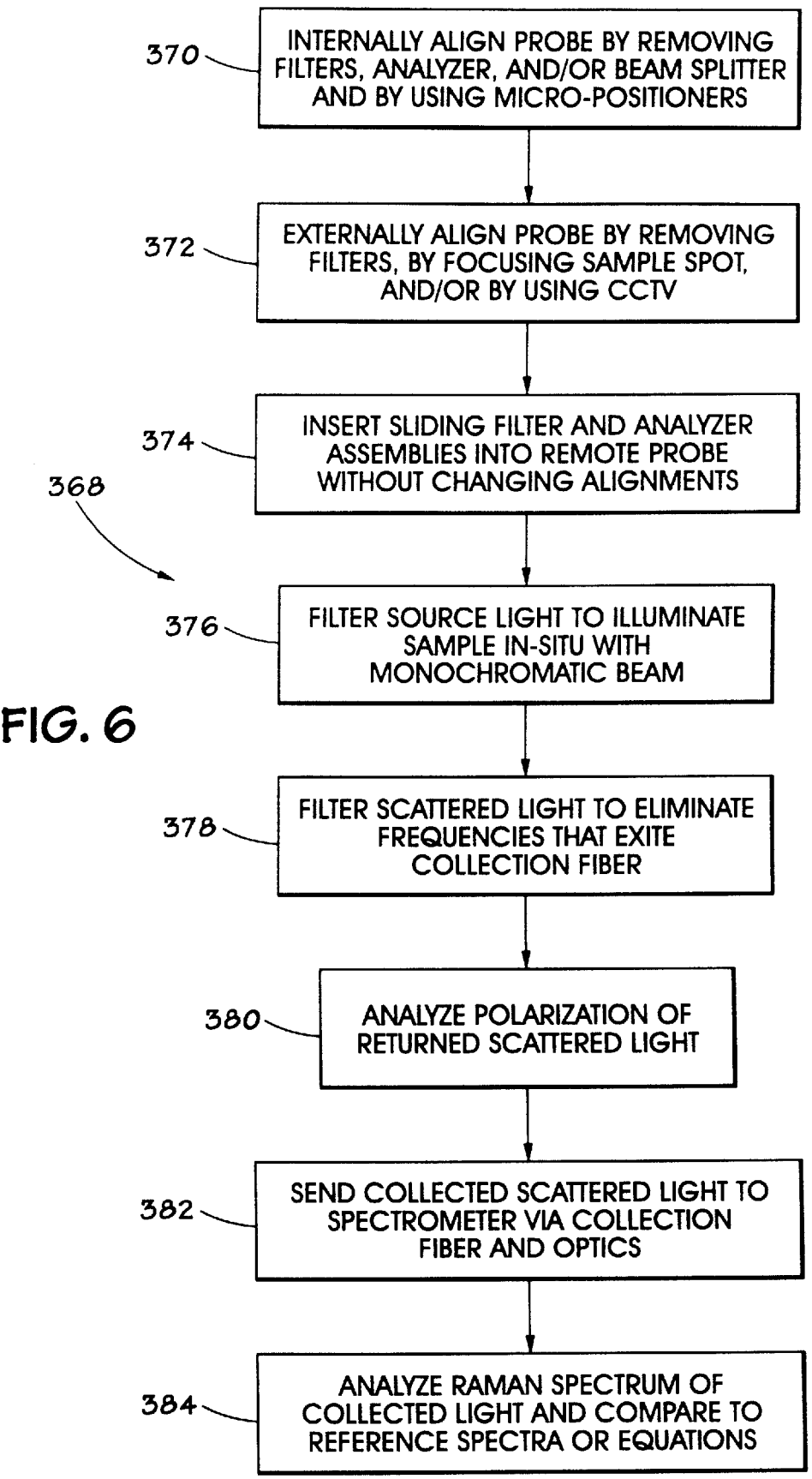
FIG. 6 is a flowchart illustrating the acts of a method for using the apparatus of FIG. 5A to measure the Raman spectrum of a sample.

FIG. 6 is a flowchart illustrating a method 368 for measuring Raman spectra with the device 326 of FIG. 5A. At block 370, the probe 326 is internally aligned. The lens systems 106, 116, 128, and 248 of FIGS. 2A and 4A are aligned to increase the throughput of light in the probe 326. In some embodiments the beam splitter 112 is slid out of the beam paths of the probe 326 during some portions of the internal alignment. In some embodiments, one or more of the filters 110, 126 and/or the analyzer 124 are removed from the probe 326 during some or all acts of the internal alignment. Micro-positioners, such as the micro-positioners 141 and 148 of FIG. 2B, hold the lens systems 106 and 128, and may be used to perform a portion of the internal optical alignments. At block 372, the probe is externally aligned on the sample 120. The external alignment includes aligning and focusing the reflected beam 114 to the spot 118 shown in FIGS. 2A and 4A. The external alignment typically involves displacing and rotating the probe 326 by means of a support structure (not shown). During the internal and external alignment, it may be preferable to enhance the visibility of the spot 118 and various light beams internal and external to the probe 326 by removing the filter 110. In the embodiment 260 of FIG. 4B, the CCTV 250 may be employed to control the external alignment. At block 374, the filters 110, 126 and/or the analyzer 124 are reinserted into the probe 326 without substantially changing the external or internal alignments performed at blocks 370 and 372. The sliding assemblies 144, 154, and 158 of FIG. 2B, 2C and 4B facilitate sliding the filters 110 and 126 and the analyzer 124 into the probe 326 without changing the alignments.

At block 376, the source light is filtered to make the beam 114 of FIG. 2A or FIG. 4A substantially monochromatic. Since the remote probe 326 is only attached to the optical bench setup 328 of FIG. 5A by the delivery and collection optical fibers 102 and 130, respectively, the probe 326 may be placed close to the sample 120 and may perform in-situ measurements. At block 378, light scattered by the sample 120 is filtered to substantially eliminate background light that may excite the collection fiber 130, e.g., frequencies of the original source beam. At block 380, the polarization of the returned scattered light is measured in some embodiments. At block 382, the collected scattered light is sent, via the collection fiber 130, to the analyzing device 356. At block 384, the Raman spectrum of the collected light is analyzed and, in some embodiments compared to reference values relating spectral features to physical properties of the sample.

Figure 7:
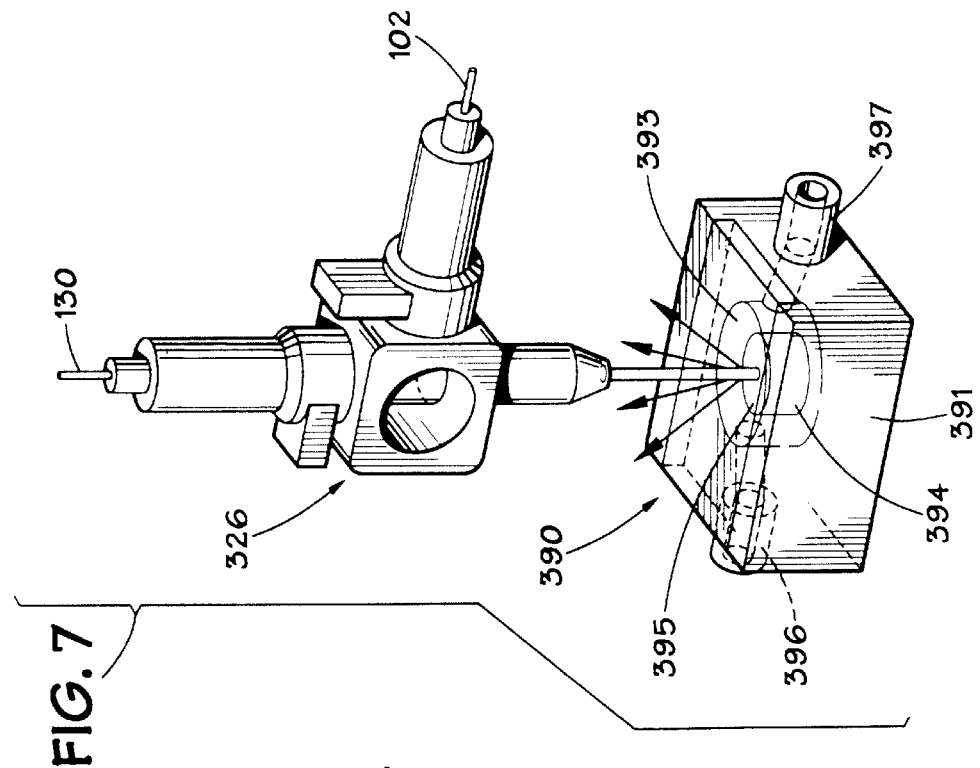
FIG. 7 illustrates a setup for making reference measurements of the physical properties and Raman spectra of polymers.

FIG. 7 illustrates a setup 390 for collecting reference spectra which may be used later to analyze measured Raman spectra. The setup 390 includes a housing 391 that can be maintained at a constant and regulatable temperature. The housing contains a glass window 392 that encloses a sample chamber 393, a sample pan 394 for holding a reference sample 395, and in-take and out-take ports 396 and 397 to maintain a flow of an inert gas over the sample 395. By performing Raman measurements on the reference sample 395, the measuring device 320 of FIG. 5A and the probe 326 may be calibrated for later comparison with measurements from unknown samples. The invention is not intended to be limited to the setup 390 but rather to also include other setups and methods for calibrating the device 320 and the probe 326 known to persons of ordinary skill in the art having the knowledge of the present disclosure.

2. Measuring Physical Properties of Polymers

Figure 8A:
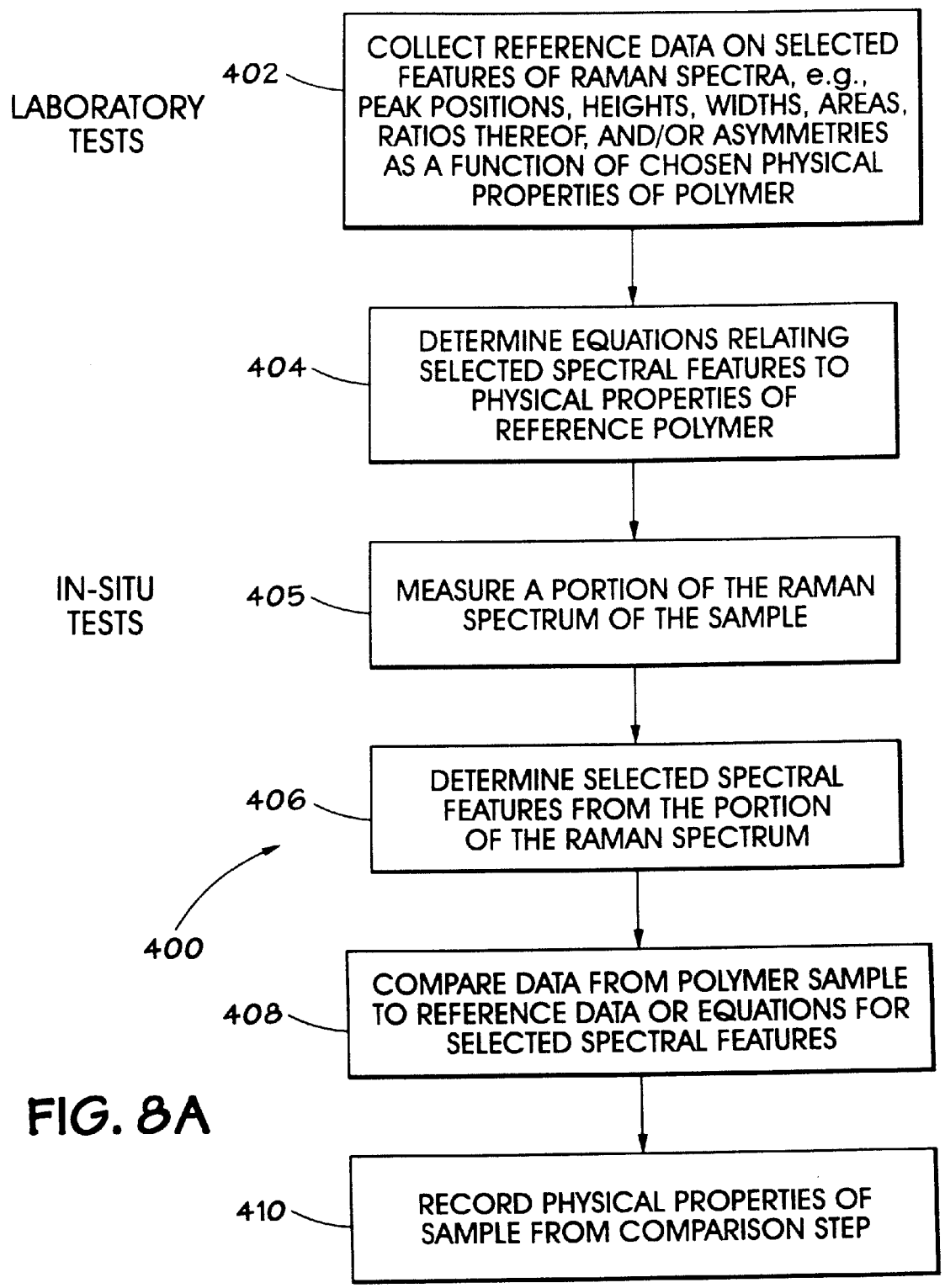
FIG. 8A is a flowchart illustrating the acts of a method for determining the physical properties of a sample by measuring selected features of the Raman spectrum.

FIG. 8A is a flowchart illustrating the acts of a method 400 for determining chosen physical properties of a polymer sample. The chosen properties may include temperature, crystallinity, crystalline orientational state, and applied stress. The method 400 includes laboratory acts performed on a known reference sample and in-situ acts on the unknown sample. The laboratory acts may use the apparatus 390 of FIG. 7 or another apparatus. The in-situ acts may employ the apparatus illustrated in FIGS. 2A, 2B, 2C, 3, 4A, 4B, and 5A or another apparatus for measuring Raman spectra.

The laboratory acts entail collecting reference values that relate selected spectral features to the chosen physical properties. At block 402, select one or more features of the Raman spectrum and collect reference data on the selected features as a function of the chosen physical properties. The reference data determines the functional relationship between the values of the selected spectral features and the chosen physical properties. In various embodiments, the selected spectral features may include peak positions, peak widths, peak heights, ratios of peak heights, ratios of peak areas, and peak asymmetries. If peak area or peak height is selected, the laboratory act entails calibrations of the measuring apparatus. The selected spectral features are unambiguously identifiable for the chosen range of the physical properties, e.g., the only spectral peak in a chosen range is an unambiguous feature. At box 404, some embodiments determine one or more reference equations relating the selected spectral features to the chosen physical properties. Some selected spectral features depend on two or more physical properties. In such cases, the reference equations turn out to be multi-variable equations.

The in-situ acts include measurements on and analysis of data from the polymer sample of interest. At block 405, measure a portion of the Raman spectrum of the polymer sample that includes the selected spectral features. At block 406, determine the value of the selected spectral features from the measured portion of the Raman spectrum. The determination of the values of the spectral features includes identifying the selected peaks from the portion of the spectrum measured. At block 408, compare data from the sample to the reference values that relate the selected spectral features to the chosen physical properties and obtain values for the physical properties of the sample. The comparison may entail comparing the measured value of the spectral feature to the reference data from block 402 or using the measured value of the spectral feature to solve the reference equations from block 404. At block 410, record the physical properties of the sample found from the comparison.

Figure 8B:
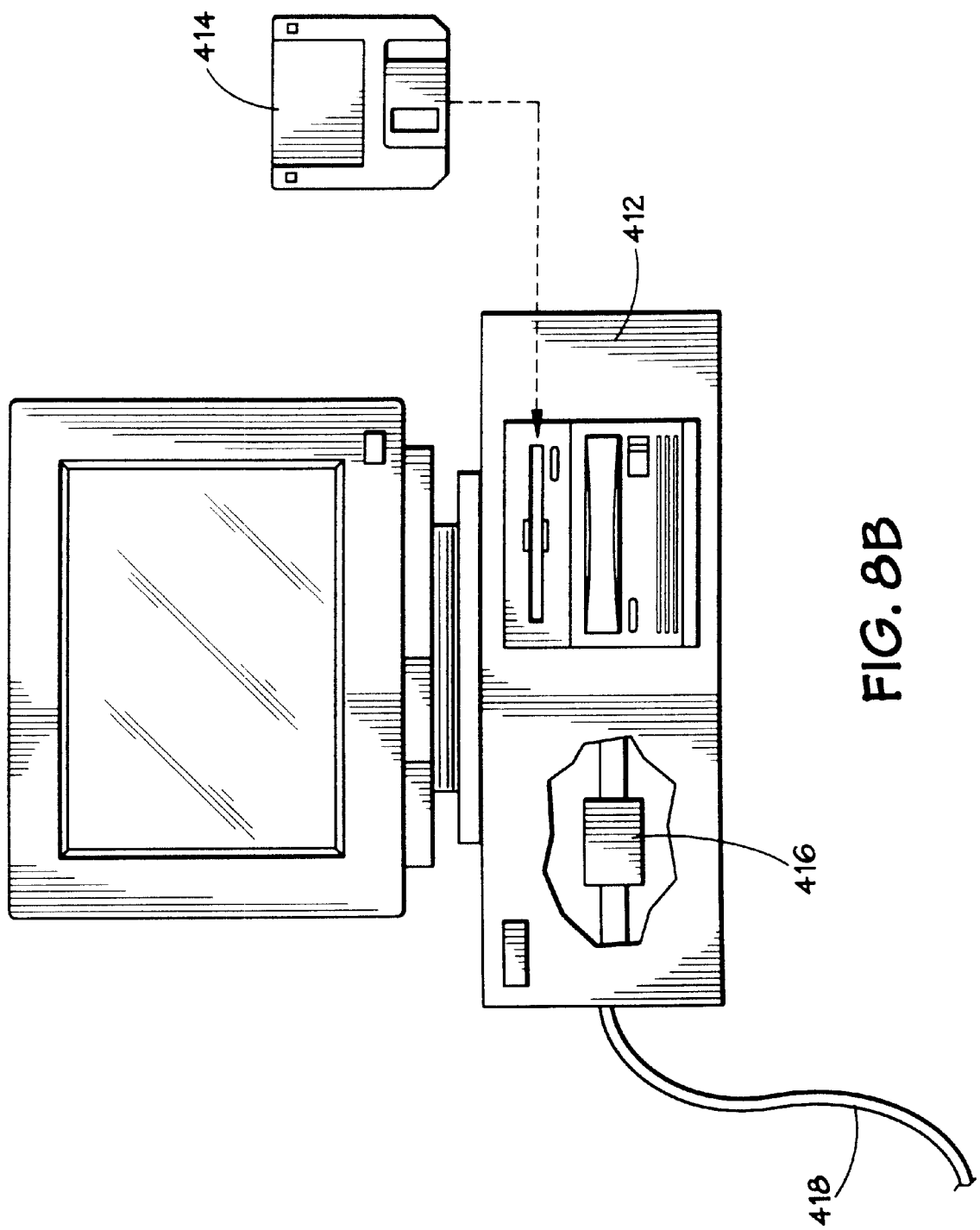
FIG. 8B is a computer having a program, the program having instructions for the acts of the method of FIG. 8A.

FIG. 8B shows a computer 412 that performs the determining, comparing, recording and/or measuring acts of the method 400 of FIG. 8A. The computer 412 has a computer readable and executable program either embodied in a tangible medium such as a floppy disk 414 or an optical disk (not shown) or stored in a main memory 416 of the computer 412. The computer 412 also includes an input line 418 for receiving signals from the CCD 358 of FIG. 5A or from an electrical device (not shown) that further processes the electrical output signal of the CCD 358. The instructions for performing the act of determining of the method 400 of FIG. 8A include instructions for identifying selected peaks and for finding the values of the selected spectral features. Referring to FIG. 8A, the comparing instructions use the determined values of the selected features, from block 406, either to compare with the reference data, obtained in block 402, or to solve the reference equations, obtained in block 404. The comparison finds the values of physical properties of the sample. In some embodiments, the program also includes instructions for controlling the measurement of the portion of the Raman spectrum in block 405, e.g., by the apparatus 320 of FIG. 5A. In these embodiments the computer 412 performs automated determinations of the chosen physical properties by controlling both the measurements and the analysis of the Raman spectra.

Some embodiments measure physical properties of nylon by using the method 400 of FIG. 8A. FIG. 9A shows a portion of a Raman spectrum of nylon-66 measured at 20° C. for a sample that is 50 percent crystalline in the isotropic orientational state. The portion of the spectrum shown includes several peaks. A large double peak 420 located at about a 2900 $cm^{-1}$ is associated with vibrations of the methyl backbone of the nylon molecule. A smaller peak 421 located at about 3300 $cm^{-1}$ is associated with vibrations of an NH bond. A fingerprint region 422 containing several vibrational peaks extends from about 800 $cm^{-1}$ to about 1700 $cm^{-1}$. FIG. 9B is an enlargement of the fingerprint region 422. A distinctly asymmetric peak 423, known as the Amide I vibrational peak, is located at about 1645 $cm^{-1}$. The Amide I peak 423 of FIGS. 9A–9B, the large double peak 420 of FIG. 9A, and the NH stretch vibrational peak 421 of FIG. 9A are all sensitive in varying degrees to the temperature, the crystallinity, the applied stress, and the orientational state of the nylon sample.

The Amide I, $CH_2$ symmetric and asymmetric stretch, and NH stretch vibrational peaks 423, 420, and 421 are caused by vibrations of functional groups of the polymer. Other polymers having these functional groups would also ordinarily exhibit similar vibrations at nearby frequencies. The vibrational peaks of these functional groups are sensitive in varying degrees to the temperature, crystallinity, applied stress, and orientational state of the polymer. In other polymers the vibrational peaks for these functional groups may be selected for measuring the above-mentioned physical properties using the method 400 of FIG. 8B.

Figure 10:
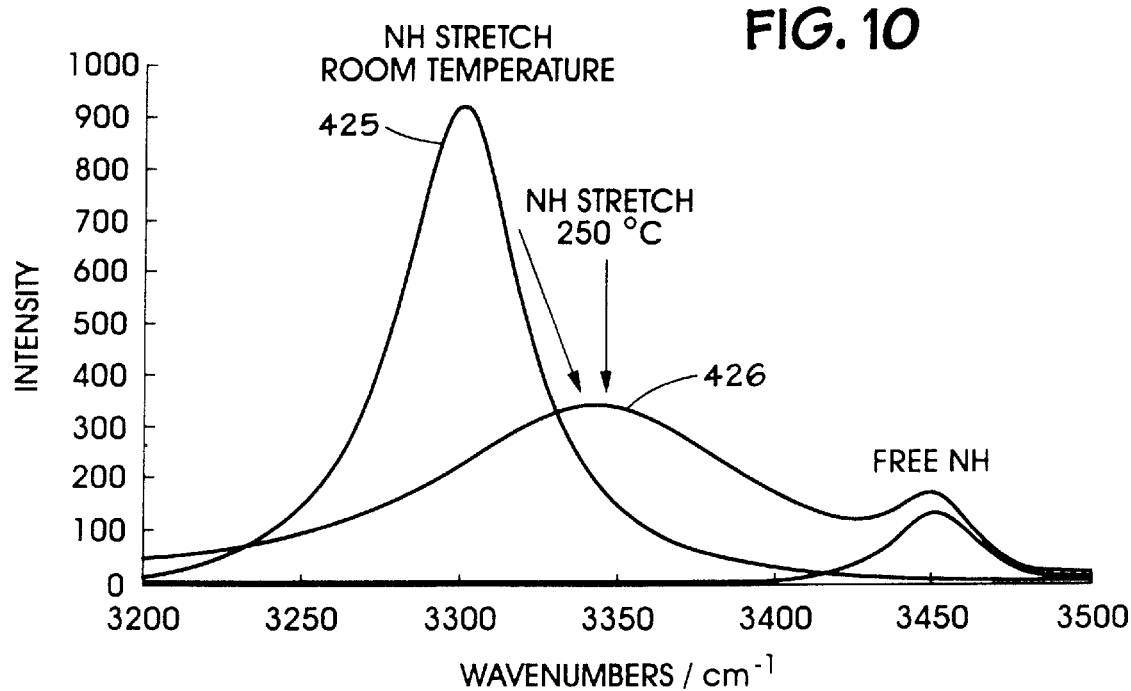
FIG. 10 illustrates the shift of the NH stretch vibrational peak of nylon-66 with temperature.

FIG. 10 illustrates the functional dependence of the NH stretch vibrational peak. i.e. the peak 421 of FIG. 9A, on the temperature of the sample. At 20° C., the NH stretch vibrational peak 425 is high and located at about 3300 $cm^{-1}$. At 250° C., the NH stretch vibrational peak is lower and located at about 3350 $cm^{-1}$. In FIG. 10, the NH stretch vibrational peak 425 and 426 is distinguishable as the only peak between 3200 $cm^{-1}$ and 3400 $cm^{-1}$ for temperatures in the chosen range from about 20° C. to about 250° C. FIG. 10 shows that the position of the NH stretch vibrational peak may be used to measure the temperature of a nylon sample.

Figure 11A:
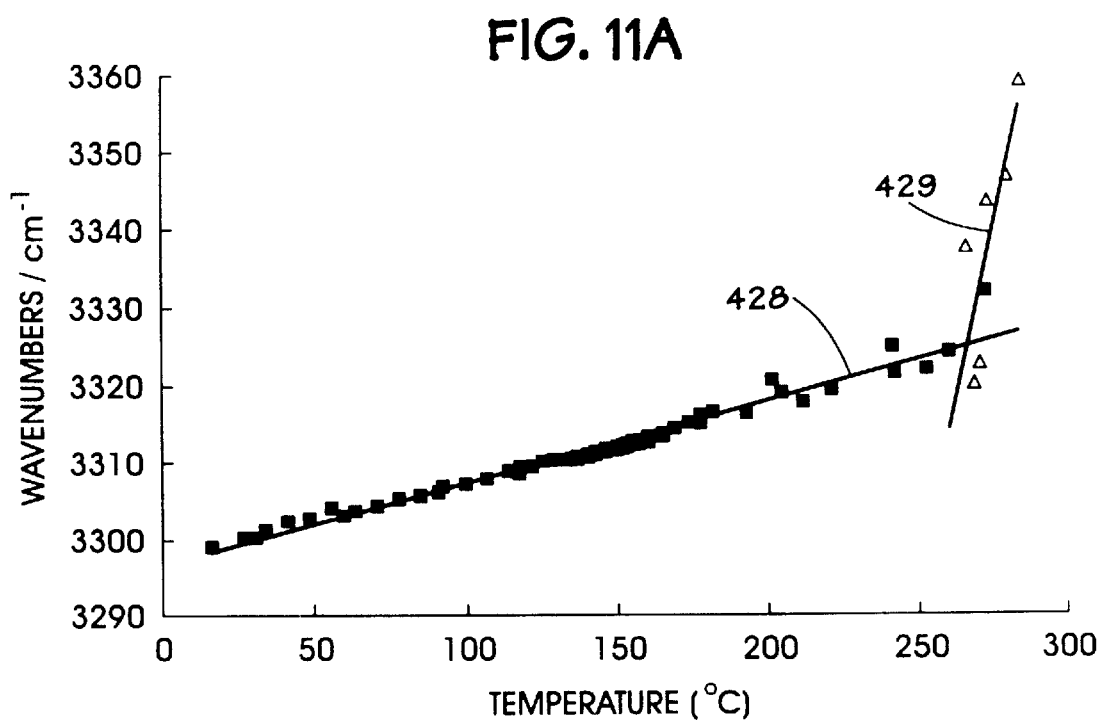
FIG. 11A illustrates experimental results for the variation of the position of the NH stretch vibrational peak of nylon-66 as a function of temperature.

FIG. 11A is a plot of the "position" of the NH stretch vibrational peak as a function of temperature. The reference data shows that the position of the NH stretch vibrational peak is well described by two linear curves 428 and 429. For temperatures between about 20° C. and about 250° C., the position of the NH stretch vibrational peak is described by the reference equation W=(0.1071T+3300) $cm^{-1}$. Here, W is the wavenumber for the position of the NH stretch vibrational peak, and T is the temperature in degrees centigrade of the nylon sample.

Figure 11B:
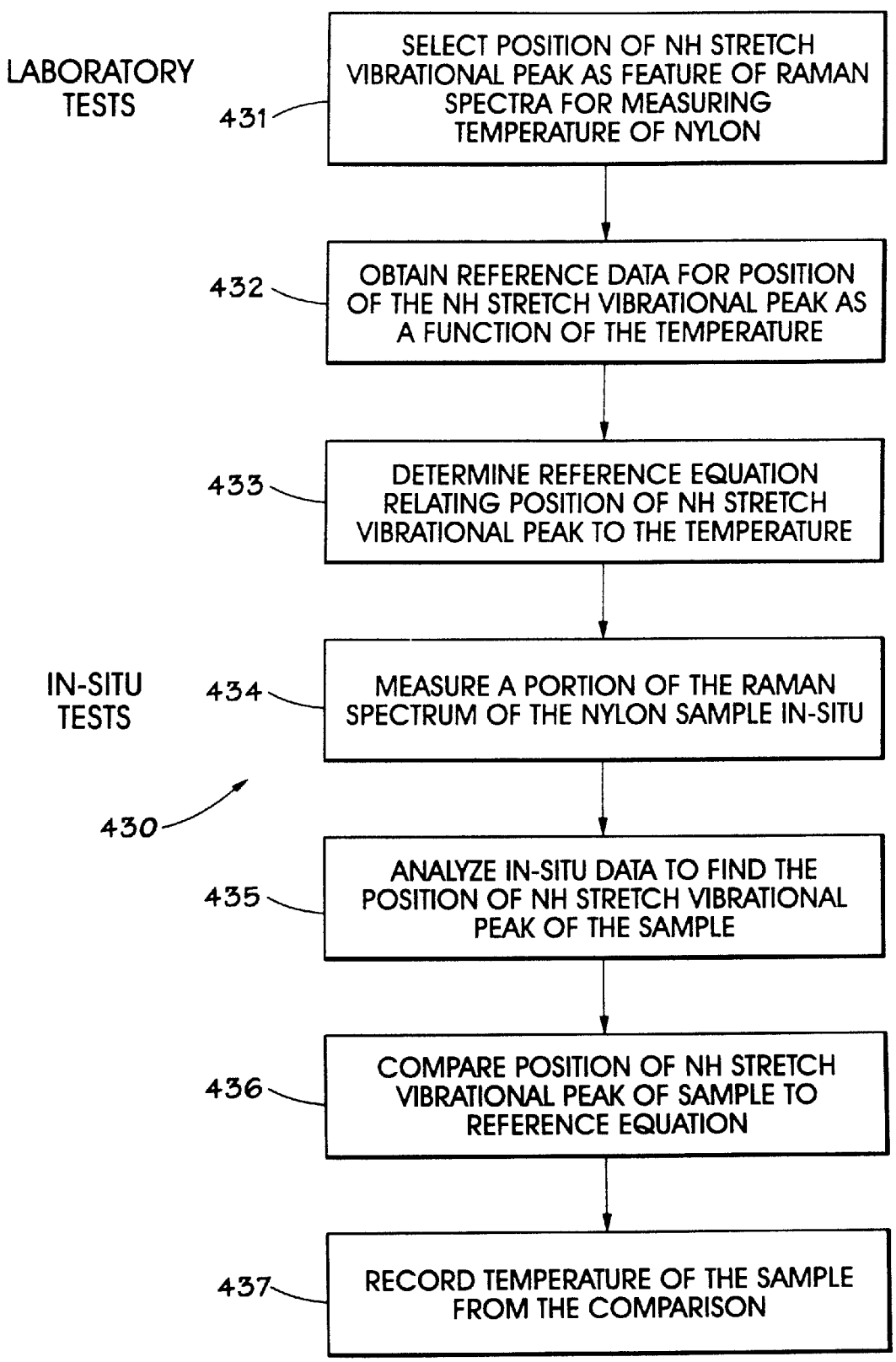
FIG. 11B is a flowchart illustrating the acts of a method that uses the position of a Raman peak to measure the temperature of a polymer sample.

FIG. 11B is a flowchart illustrating a method 430 for determining the temperature of a nylon sample if the temperature is in the range from about 10° C. to about 260° C. At block 431, select the position of the NH stretch vibrational peak as the spectral feature for measuring temperature, because the position of the NH stretch vibrational peak varies with temperature and the NH stretch vibrational peak is unambiguously distinguishable. At block 432, perform laboratory tests, e.g., for example with the apparatus 390 of FIG. 7, to obtain reference data on the position of the NH stretch vibrational peak as a function of temperature. At block 433, use the reference data to determine a reference equation for the position of the NH stretch vibrational peak as a function of temperature. At block 434, perform in-situ measurements of a portion of the Raman spectrum of the sample of nylon under test. At block 435, analyze the Raman spectrum to determine the position of the NH stretch vibrational peak. At block 436, compare the measured position of the NH stretch vibrational peak to the reference values, from blocks 432 or 433, that relate the position of the peak to temperature and determine the temperature of the nylon sample. In some embodiments, the reference equation is simply solved to determine the temperature. At block 437, record the temperature of the nylon sample obtained from the comparison.

Figure 12:
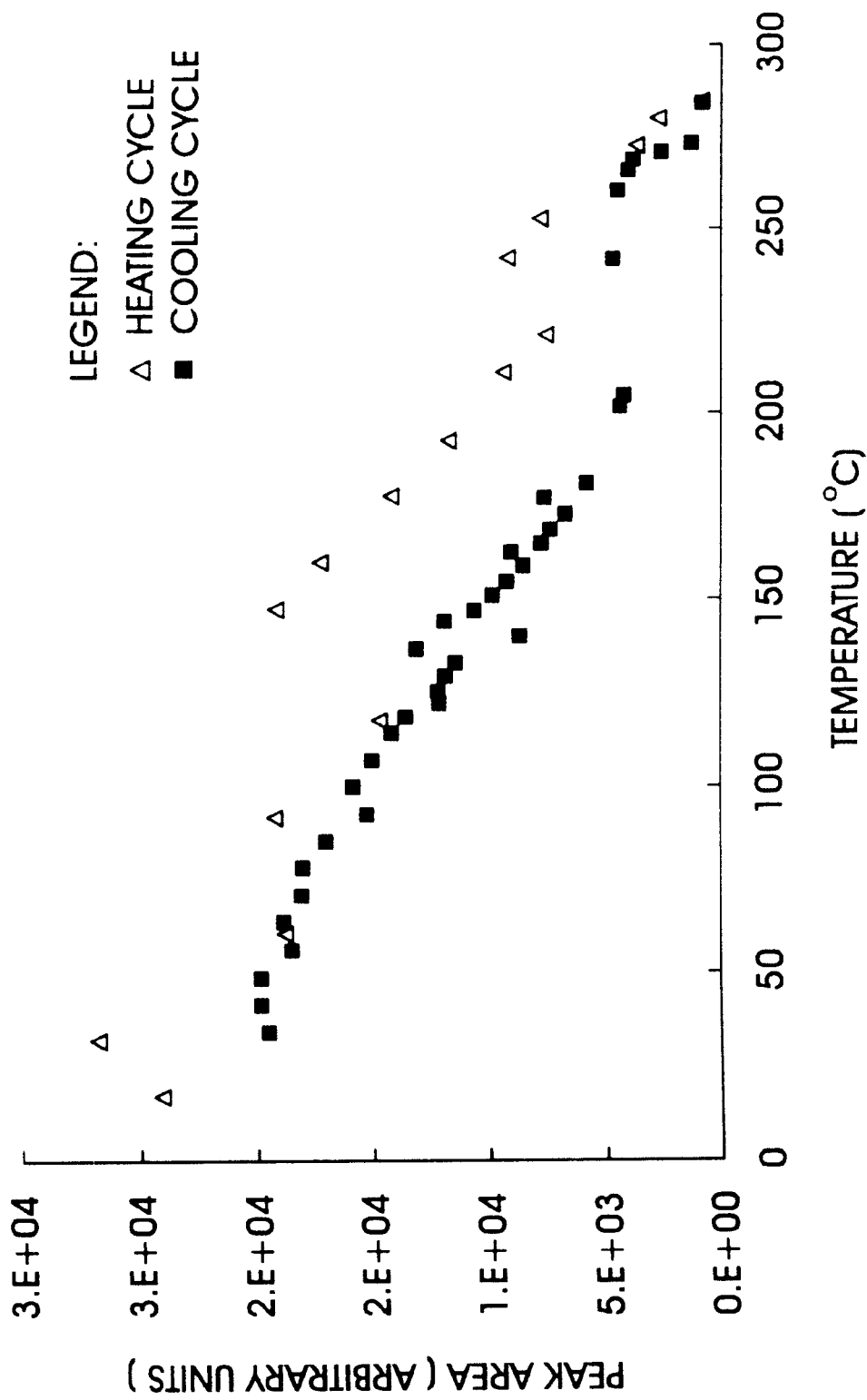
FIG. 12 illustrates measurements of the area under the NH stretch vibrational peak of nylon-66 as a function of temperature.

FIG. 12 illustrates the functional dependence of the area under the NH stretch vibrational peak on temperature of the sample. The area under the NH stretch vibrational peak decreases measurably with temperature. The normalization of the area, however, depends on the particular measuring configuration, i.e. distance from the sample, aperture, intensity of the source, etc. The dependence of the peak area on the particular measuring configuration makes this spectral feature more difficult to use for measuring physical properties of the sample.

Figure 13A:
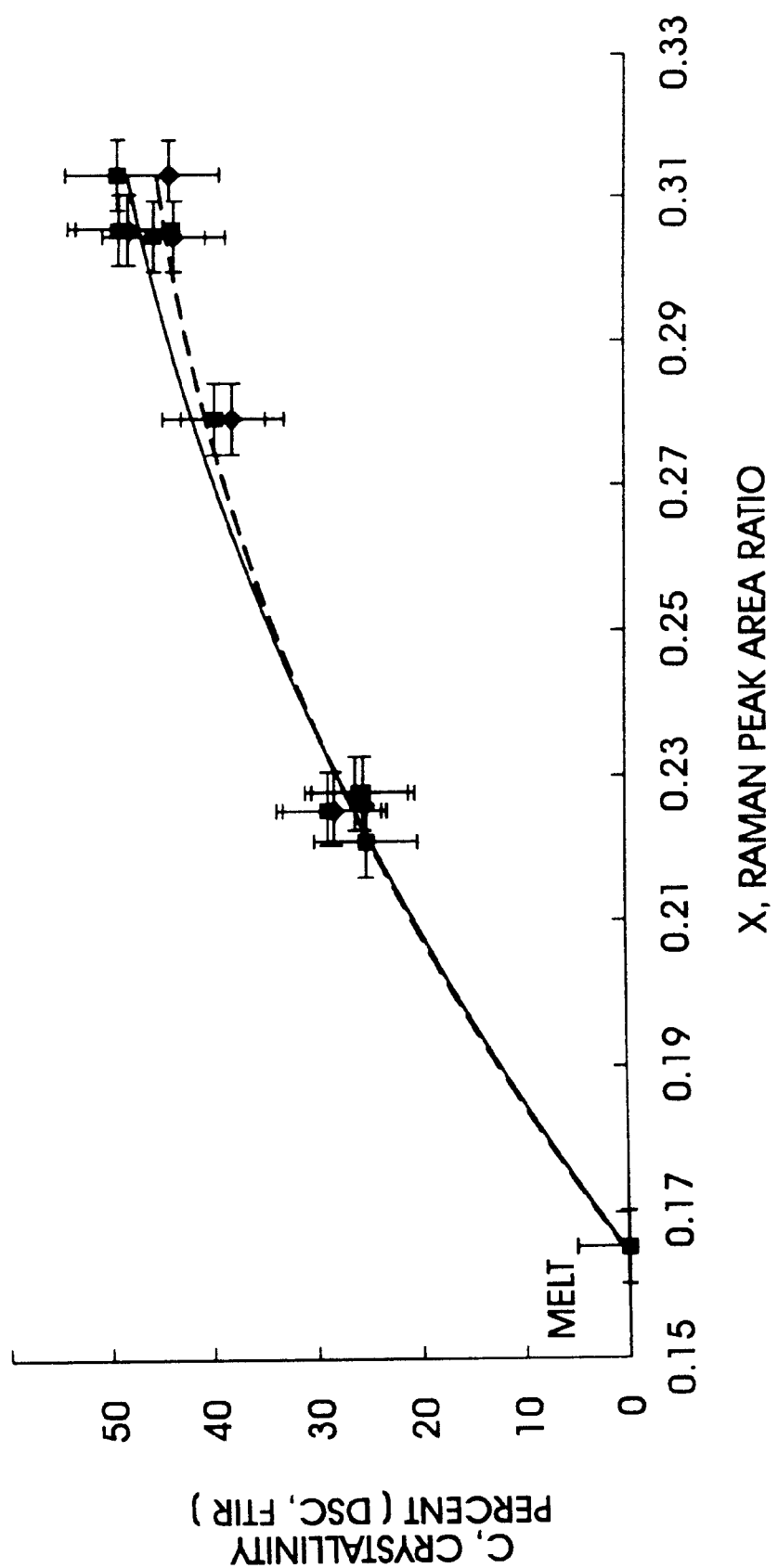
FIG. 13A shows experimental results for the crystallinity fraction of nylon-66 as a function of the ratio of the areas under the two peaks near 2900 $cm^{-1}$.

The large double peak or envelope 420 of FIG. 9A is a spectral feature that may be selected to measure physical properties of the polymer. The envelope 420 is composed of well-defined large and small peaks 438 and 439, respectively. The large and small peaks 438 and 439 are identifiable as the only peaks between about 2800 $cm^{-1}$ and 3200 $cm^{-1}$ for samples between 0% and 50% crystalline.[1] FIG. 13A shows approximate measurements relating the ratio, X, of the areas of the deconvoluted large and small peaks 438 and 439 to crystallinity percentage C. The peak area is defined to be the area under the spectral intensity curve, e.g., the curve in FIG. 9A, between the nearest intensity minima on each side of the summit of the peak. The measured ratio of peak areas, X, satisfies an approximate reference equation: C=1170.2 $X^2$+883.7 X−113.65. Though the ratio of the areas of large and small peaks 438 and 439 does depend substantially on temperature the ratio is not dependent on the particular measuring configuration. Reference spectra can be generated to analyze the effect of temperature. Then, the ratio of the peak areas of the large and small peaks 438 and 439 may be selected as the spectral feature for measuring the crystallinity percentage in nylon providing that the temperature is known.

[1] These peaks may be deconvoluted by fitting multiple Lorentzian peaks to the envelope.

Figure 13B:
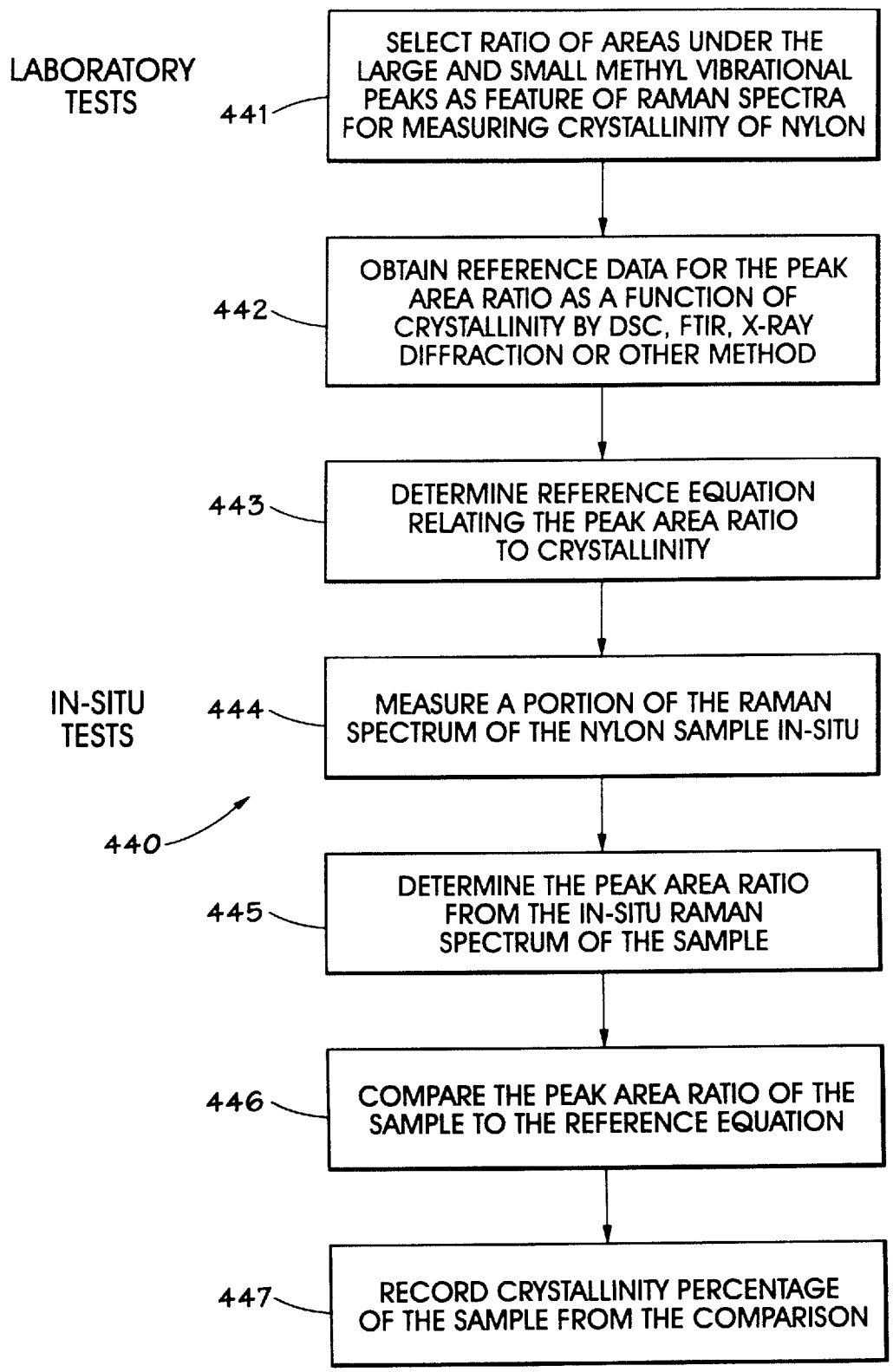
FIG. 13B is a flowchart illustrating the acts of a method that uses the ratio of the areas under two peaks to measure the crystallinity of a polymer sample.

FIG. 13B is a flowchart illustrating a method 440 for measuring the crystallinity of a nylon sample. At block 441, select the ratio of the areas of the deconvoluted large and small peaks 438 and 439 in FIG. 9A, to be the spectral feature that measures crystallinity, because the peaks 438 and 439 are identifiable and the ratio of deconvoluted peak areas depends on the crystallinity. At block 442, collect reference data on the dependence of the peak area ratio of the selected peaks on the crystallinity as measured with differential scanning calorimetry (DSC) or another method, e.g., Fourier transform infrared spectroscopy or X-ray diffraction. At block 443, obtain the reference equation relating the peak area ratio to the crystallinity. At block 444, measure a portion of the Raman spectrum of the sample. At block 445, determine the ratio of the peak areas from the measured portion of the Raman spectrum of the sample. At block 446, compare the measured ratio to the reference values that relate the area ratio to crystallinity and obtain the crystallinity of the sample. The comparison entails either comparing the measured ratio to the reference data from block 442 or using the measured ratio to solve the reference equation of block 443 for the crystallinity. At block 447, record a value for the crystallinity obtained from the comparison.

Considering the Amide I vibrational peak, one method for measuring the asymmetry of a peak separates the selected peak into two Lorentzian components. The separation involves three steps. First, determine whether the left or the right side of the asymmetric peak is steeper. Next, fit the measured peak by a first Lorentzian peak that is centered on the summit of the asymmetric peak, has a height equal to the height of the asymmetric peak, and fits the steeper side of the asymmetric peak well. Next, subtract the first Lorentzian peak from the asymmetric peak to obtain a second peak. By construction the second peak is approximately Lorentzian and is positioned on the less steep side of the asymmetric peak. The second peak is the second Lorentzian component of the asymmetric peak. The peak positions of the two Lorentzian components may be taken as a spectral feature quantitatively defining the asymmetry of the original peak.

Figure 14A:
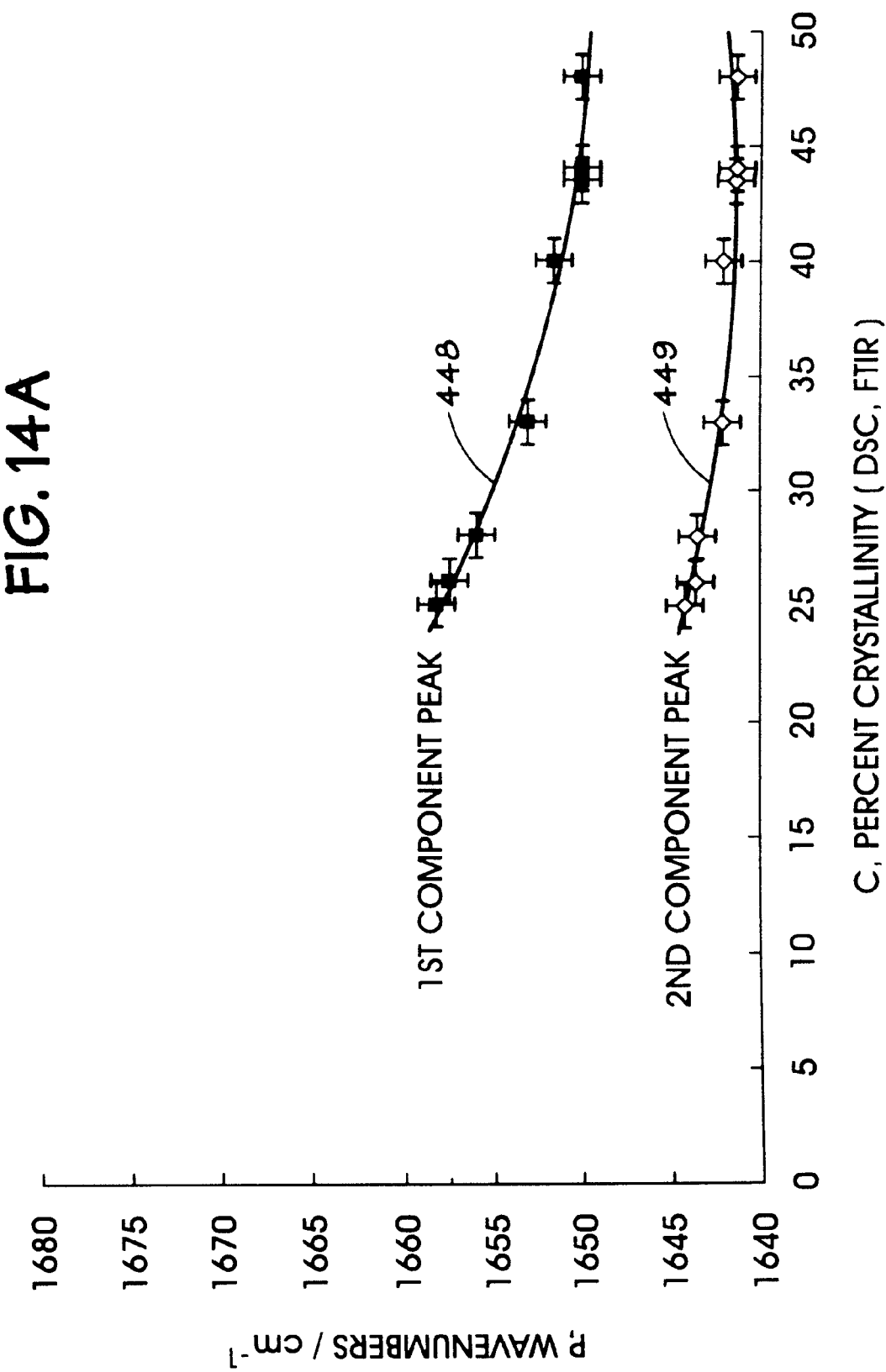
FIG. 14A shows experimental results for the crystallinity fraction of nylon-66 as a function of the position of the Amide I vibrational peak.

Upper and lower curves 448 and 449 of FIG. 14A show the position of the two Lorentzian components of the asymmetric Amide I vibrational peak, i.e. the peak 423 of FIGS. 9A and 9B as a function of the crystallinity of the sample. The reference data is taken at 20° C. and the crystallinity percentage is measured with DSC. The peak positions, P, satisfy the approximate equations $P=0.011 C^2 -1.17C+1680$, for the higher wavenumber component, and $P=0.01C^2-0.80C+1658$, for the lower wavenumber component, where C is the crystallinity percentage. The peak positions of the two Lorentzian components of the Amide I vibrational peak may he selected as a spectral feature for measuring crystallinity.

Figure 14B:
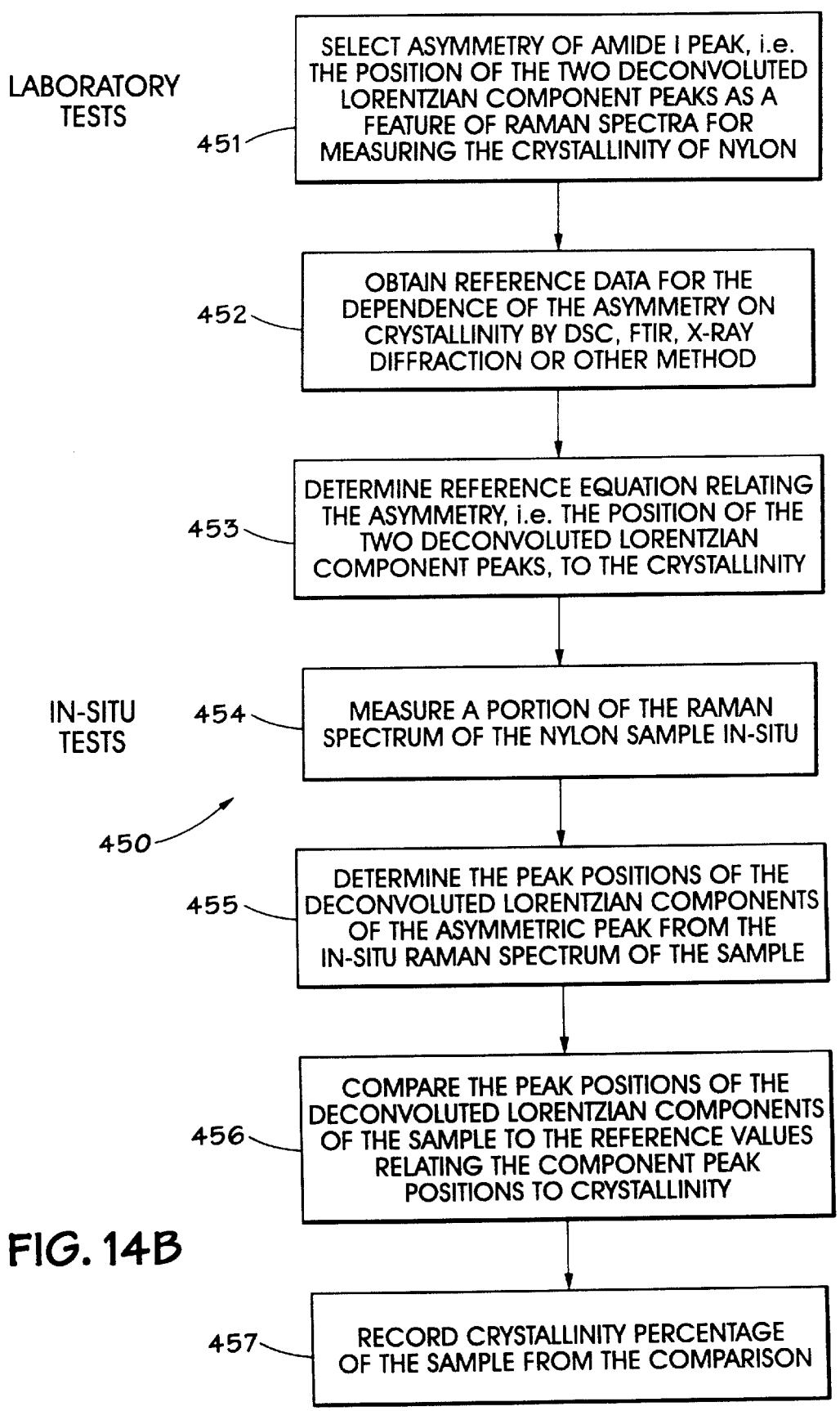
FIG. 14B is a flowchart illustrating the acts of a method that uses the asymmetry of a Raman peak to measure the crystallinity of a polymer sample.

FIG. 14B illustrates a second method 450 for measuring crystallinity of a nylon sample. At block 451, select the asymmetry of the Amide I peak, i.e. as defined by the peak positions of the two Lorentzian components, to be the spectral feature for measuring the crystallinity. At block 452, collect reference data for the functional dependence of the peak position of the Lorentzian components on the crystallinity. Differential scanning calorimetry (DSC) or another convenient method, e.g., Fourier transform infrared spectroscopy or X-ray diffraction may be used to measure the crystallinity. At block 453, obtain a reference equation relating the peak positions of the two Lorentzian components to the crystallinity. At block 454, measure a portion of the Raman spectrum of the sample containing the selected asymmetric peak. At block 455, reconstruct the two Lorentzian components and determine the asymmetry, i.e. the peak positions of the two components from the measurements of the selected peak. At block 456, compare the measured peak positions of the Lorentzian components to the reference values that relate the separation to crystallinity and obtain the crystallinity of the sample. The comparison may entail comparing the measured peak positions to the reference data of block 452 or using the measured peak positions to solve the reference equation from block 453. At block 457, record the value for the crystallinity obtained from the comparison.

Figure 15A:
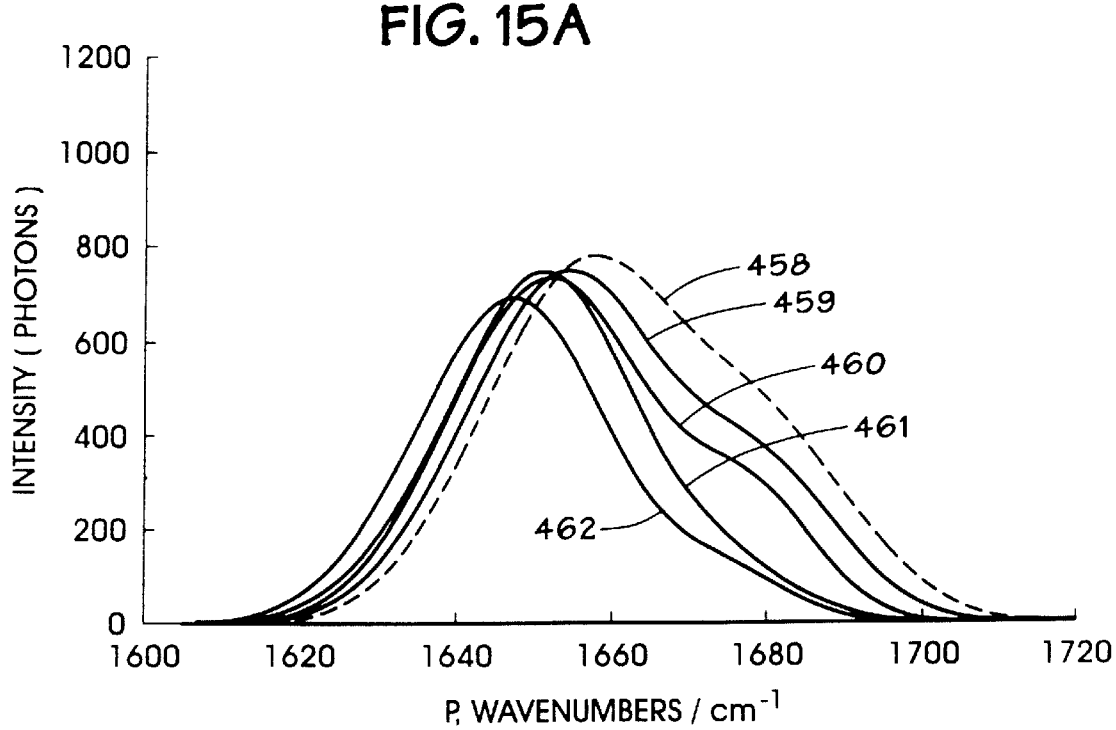
FIG. 15A illustrates the variation of the envelope of the Amide I vibrational peak of nylon-66 as a function of distance of the fiber down the quench chamber.
Figure 15B:
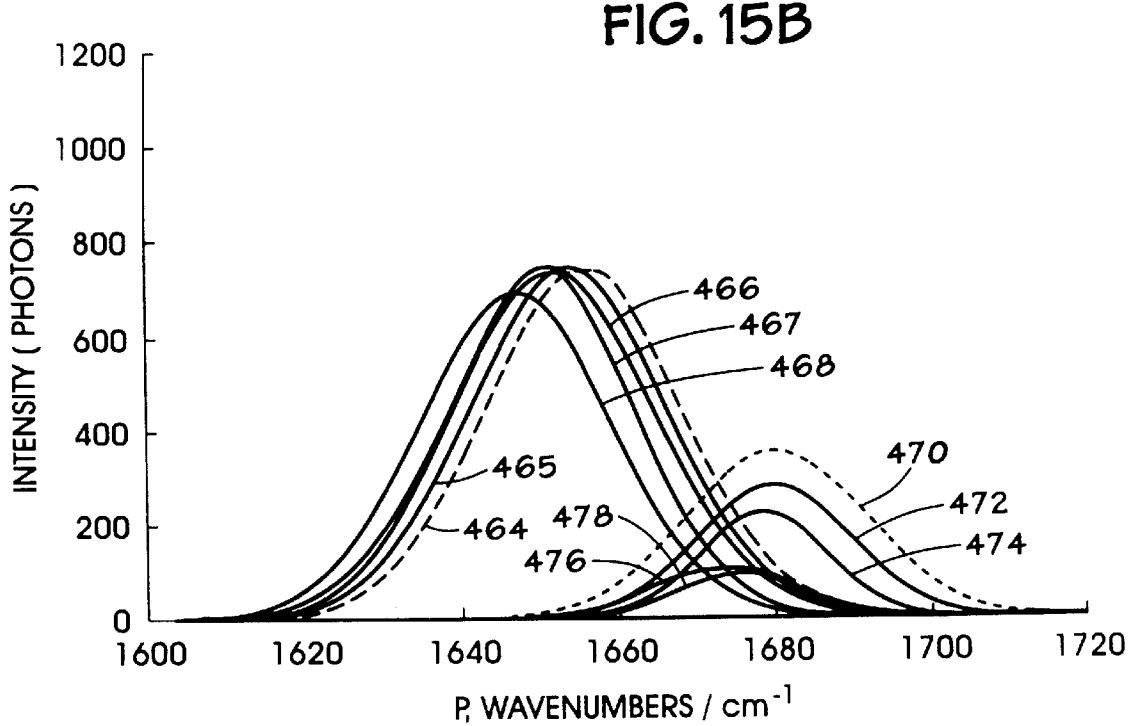
FIG. 15B illustrates the variation of the two Lorentzian components of the Amide I vibrational peak of nylon-66 as a function of distance of the nylon fiber down the quench chamber.

FIGS. 15A and 15B illustrate the asymmetry of the Amide I peak, i.e. the peak 423 of FIG. 9B, from portions of nylon fibers 322 of FIG. 5B at different production stages. FIG. 15A shows an asymmetric Amide I peak obtained from portions of the nylon fibers 322, of FIG. 5B, at various positions in the quench chamber 362. The peaks 458, 459, 460, 461, and 462 of FIG. 15A are obtained from portions of the nylon fibers 322 located at 2, 11, 17, 36, and 46 inches from the face of the spinneret 324 of FIG. 5B. FIG. 15B shows the shorter wavenumber Lorentzian component 464, 465, 466, 467, and 468 and the longer wavenumber Lorentzian component 470, 472, 474, 476, and 478 of the Amide I peak from the portions of the nylon fibers 322 located at 2, 11, 17, 36, and 46 inches from the face of the spinneret 324 in FIG. 5B. FIGS. 15A and 15B illustrate that the position of the asymmetric Amide I peak and the positions of the two Lorentzian components thereof shift as a function of the production stage of the nylon fiber 322 being produced.

Figure 16:
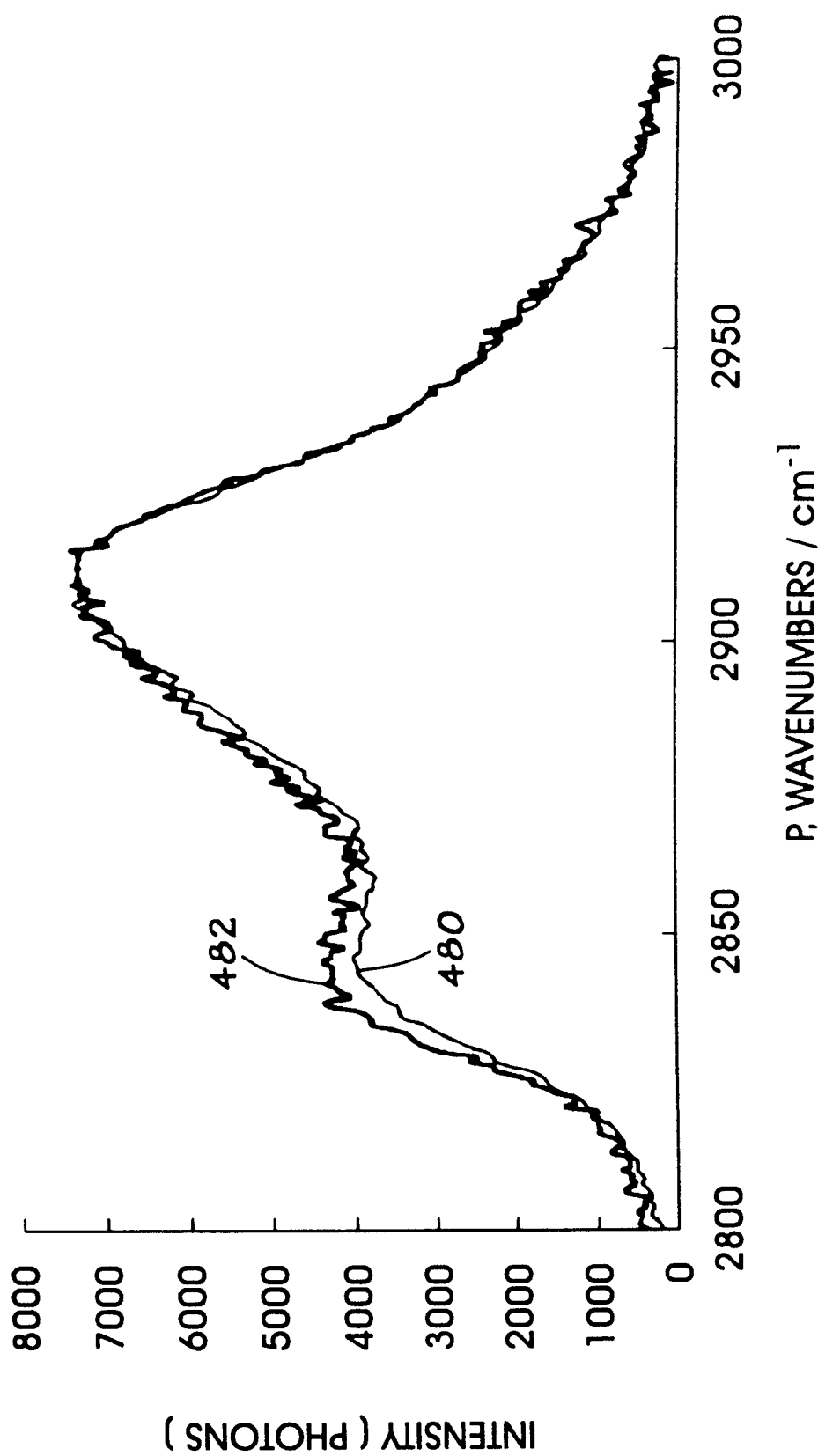
FIG. 16 illustrates the variation of the large double vibrational peak for wave numbers near 2900 $cm^{-1}$ which corresponds to the $CH_2$ symmetric and asymmetric stretch vibrations, as a function of the distance of the nylon fiber down the quench chamber.

FIG. 16 illustrates the large double peak, i.e. the peak 420 of FIG. 9A, from portions of the nylon fibers 322 at different production stages of the industrial facility of FIG. 5B. The peaks 480 and 482 of FIG. 16 were obtained from portions of the nylon fibers 322 located 5 and 55 inches, respectively, from the spinnerets 324 of the industrial facility 360 of FIG. 5B. The fact that the ratio of the area of the larger and smaller components of the double peak varies with distance down the quench chamber 362 indicates that the temperature of the portions of the fibers 322 is different. The peak position and peak area ratios of FIGS. 16, 15A, and 15B provide a non-destructive method for determining both the temperature and the crystallinity percentage of the nylon fibers during the production process.

Figure 17:
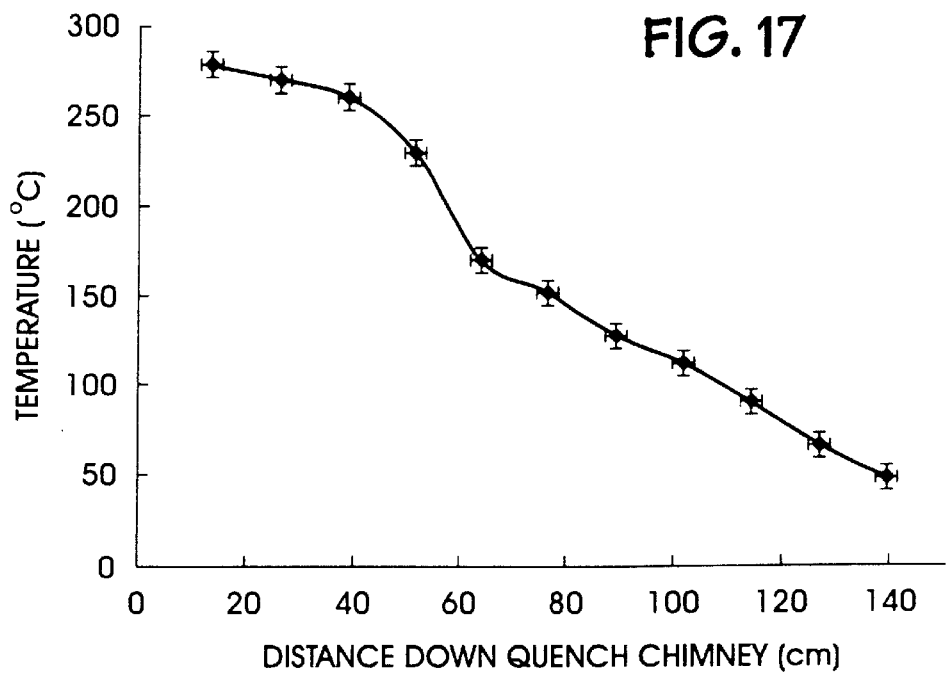
FIG. 17 shows measurements of the temperature of a nylon-66 fiber as a function of distance down the quench chamber obtained by measuring and analyzing Raman spectra.
Figure 18:
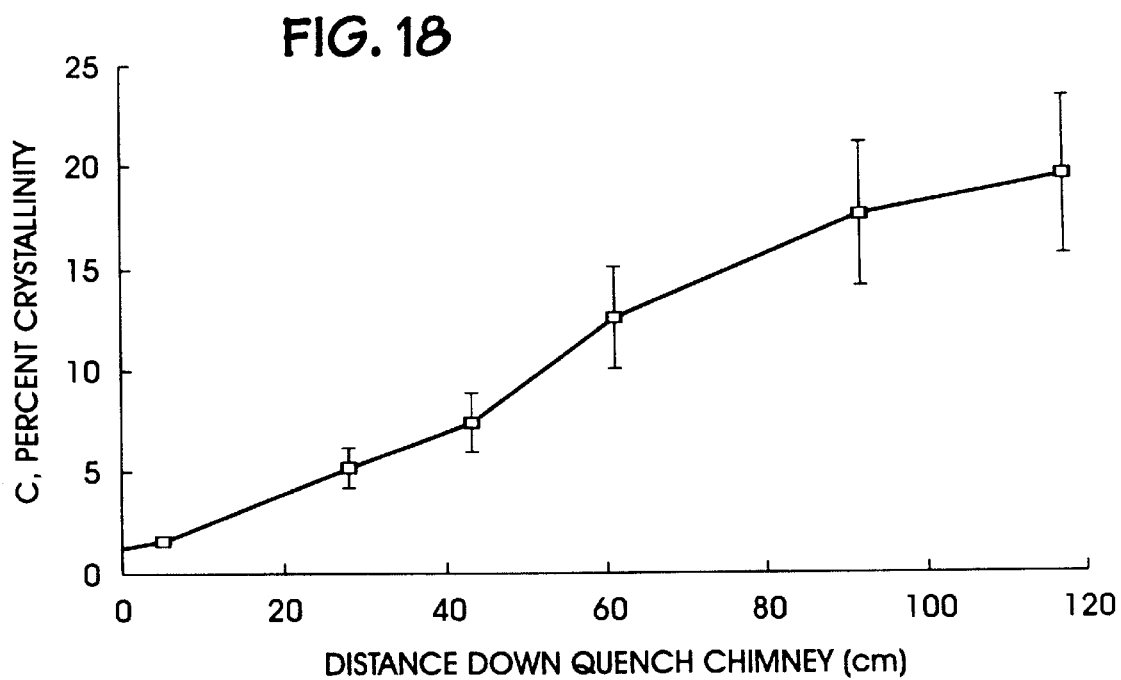
FIG. 18 illustrates the crystallinity fraction of a nylon-66 fiber as a function of distance down the quench chamber from measurements of the Amide I and NH stretch vibrational peaks.

FIGS. 17 and 18 show the temperature and the crystallinity of nylon fibers 322 proceeding down the industrial quench chamber 362 of FIG. 5B as obtained by measuring and analyzing features of the Raman spectra. In FIG. 17, the temperature results are based on measurement of the variation of position of the NH stretch vibrational peak, using the reference data of FIG. 11A. The crystallinity percentage results in FIG. 18 are based on the measurements of the positions of the deconvoluted Amide I peaks and the NH stretch peaks as illustrated in FIGS. 15A and 15B. The non-destructive measurement of these physical properties quantitatively indicates how the nylon fibers 392 of FIG. 5A cool and solidify during production.

Raman spectra are vibrational spectra and, as such, they are sensitive to changes of the molecular environment that occur when the crystalline orientational state changes or when a stress is applied. The non-destructive method 400 of FIG. 8A may also measure the crystalline orientations and the applied stresses of a polymer sample. In light of the present disclosure, persons of ordinary skill in the art can apply the method 400 of FIG. 8A to measure crystalline orientations and applied stresses without the need to perform undue experimentation.

The method 400 of FIG. 8A may select other features of the Raman spectrum to measure the physical properties of polymers. Selecting other features of the Raman spectrum and determining reference values that relate the selected features to physical properties are routine for an ordinary person in the art having the knowledge of the present disclosure.

The present invention is useful for measuring the physical properties of a variety of different polymers including any polyamide or nylon. e.g., nylon-66; polyethylene, polytetraflouroethylene, poly(ethylene terephthalate), and any semi-crystalline polymer generally. Many functional groups of semi-crystalline polymers have vibrational spectra which can be employed to measure selected physical properties through the above-mentioned techniques. Using the knowledge of this disclosure, an ordinary worker in the art would be able to use the methods described herein to measure the physical properties of other polymers without the need to perform undue experimentation.

All the methods and apparatus disclosed and claimed herein may be made and executed without undue experimentation in light of this specification. While the apparatus and methods of this invention have been described in terms of specific embodiments, it will be apparent to those of ordinary skill in the art that variations may be applied to the methods and apparatus herein without departing from the concept, spirit, and scope of the invention. All such variations and modifications apparent to those of ordinary skill in the art are deemed to be within the spirit, scope, and concept of the invention as defined by the appended claims.

What is claimed is:

1. A method for measuring a physical property of a polymer sample, comprising:
   measuring a portion of a Raman spectrum of the polymer sample;
   determining a value of a preselected spectral feature from the portion of the Raman spectrum, the value of the preselected spectral feature depending functionally on the physical property; and
   comparing the determined value of the preselected feature to reference values, the reference values relating the preselected spectral feature to the physical property.

2. The method as set forth in claim 1, further comprising recording the measurement of the physical property resulting from the act of comparing.

3. The method as set forth in claim 1, wherein the act of determining includes finding a position of a preselected peak of the Raman spectrum of the polymer sample, the position of the preselected peak being the preselected feature.

4. The method as set out in claim 3, wherein finding a position includes finding a position of a NH stretch vibrational peak.

5. The method as set out in claim 4, wherein comparing includes solving a reference equation relating the position of the NH stretch vibrational peak to the temperature of the polymer sample.

6. The method as set forth in claim 1, wherein determining includes finding a ratio of an area of a first peak to an area of a second peak, the ratio being the preselected feature.

7. The method as set out in claim 6, wherein finding a ratio includes finding areas of first and second vibrational peaks, the first and second vibrational peaks located between $2800^{-1}$ and $3000$ cm$^{-1}$.

8. The method as set out in claim 6, wherein comparing includes solving a reference equation relating the ratio to the crystallinity of the polymer sample.

9. The method as set forth in claim 1, wherein determining includes calculating an asymmetry of a preselected peak of the Raman spectrum, the asymmetry of the preselected peak being the preselected feature.

10. The method as set out in claim 9, wherein calculating includes finding an asymmetry of an Amide I vibrational peak.

11. The method as set out in claim 10, wherein finding includes solving a reference equation relating the asymmetry of the Amide I peak to the crystallinity of the polymer sample.

12. The method as set forth in claim 1, wherein the act of comparing the determined value of the preselected feature includes comparing one of a ratio of peak heights or a peak width.

13. The method as set forth in claim 1, wherein the act of comparing includes solving a reference equation for a physical property selected from the group consisting of a temperature of the polymer sample, a crystallinity percentage of the polymer sample, a crystalline orientation of the polymer sample, and an amount of stress applied to the polymer sample.

14. The method of claim 1, wherein the act of measuring includes measuring a portion of the Raman spectrum of a polyamide.

15. The method of claim 1, wherein the act of measuring includes measuring a portion of the Raman spectrum of nylon-66.

16. The method of claim 1, wherein the act of measuring includes measuring a portion of the Raman spectrum of the polymer sample during the production thereof.

17. A program storage device readable by a computer, tangibly embodying a program of instructions executable by the computer to perform the acts of a method for measuring a physical property of a polymer sample, the method comprising:
   measuring a portion of a Raman spectrum of the polymer sample;
   determining a value of a preselected spectral feature from the portion of the Raman spectrum, the value of the preselected spectral feature depending functionally on the physical property; and
   comparing the determined value of the preselected feature to reference values, the reference values relating the preselected spectral feature to the physical property.

18. The program storage device as set forth in claim 17, further comprising recording the measurement of the physical property resulting from the act of comparing.

19. The program storage device as set forth in claim 17, wherein the act of determining includes finding a position of a preselected peak of the Raman spectrum of the polymer sample, the position of the preselected peak being the preselected feature.

20. The program storage device as set out in claim 19, wherein finding a position includes finding a position of a NH stretch vibrational peak.

21. The program storage device as set forth in claim 20, wherein comparing includes solving a reference equation relating the position of the NH stretch vibrational peak to the temperature of the polymer sample.

22. The program storage device as set forth in claim 17, wherein determining includes finding a ratio of an area of a first peak to a area of a second peak, the ratio being the preselected feature.

23. The program storage device as set out in claim 22, wherein finding a ratio includes finding areas of first and second vibrational peaks, the first and second vibrational peaks being located between $2800$ cm$^{-1}$ and $3000$ cm$^{-1}$.

24. The program storage device as set forth in claim 22, wherein comparing includes solving a reference equation relating the ratio to the crystallinity of the polymer sample.

25. The program storage device as set forth in claim 17, wherein determining includes calculating an asymmetry of a preselected peak of the Raman spectrum, the asymmetry of the preselected peak being the preselected feature.

26. The program storage device as set out in claim 25, wherein calculating includes finding an asymmetry of a peak of the Amide I vibrational peak.

27. The program storage device as set forth in claim 26, wherein finding includes solving a reference equation relating the asymmetry of the Amide I peak to the crystallinity of the polymer sample.

28. The program storage device as set forth in claim 17 wherein the act of comparing the determined value of the preselected feature includes comparing one of a ratio of peak heights or a peak width.

29. The program storage device as set forth in claim 17, wherein the act of comparing includes solving the reference equation for the physical property selected from the group consisting of a temperature of the polymer sample, a crystallinity percentage of the polymer sample, a crystalline orientation of the polymer sample, and an amount of stress applied to the polymer sample.

30. The program storage device of claim 17, wherein the act of measuring includes measuring a portion of the Raman spectrum of a polyamide.

31. The program storage device of claim 17, wherein the act of measuring includes measuring a portion of the Raman spectrum of nylon-66.

32. The program storage device as set forth in claim 17, wherein the act of measuring includes measuring a portion of the Raman spectrum of the polymer sample during the production thereof.

33. A method for measuring a physical property of a polymer sample, comprising:

illuminating a polymer sample with a substantially monochromatic light;

collecting a portion of light scattered by said polymer sample; and measuring a selected feature of a Raman spectrum of the polymer sample by passing a portion of the collected light through a spectrum analyzing system, the feature depending functionally on the physical property, and comparing the measured feature to reference values for the feature, the reference values relating the feature to the physical property.

34. The method as set forth in claim 33, wherein the act of measuring a feature includes measuring the position for a Raman peak and wherein the act of comparing includes one of solving an equation for the physical property as a function of the position and comparing the position with a reference data set.

35. The method as set forth in claim 33, wherein the act of measuring includes measuring one of a peak asymmetry, a peak area ratio or a peak height ratio.

36. The method as set forth in claim 33, wherein the act of comparing the measured feature to reference values includes solving a reference equation relating the value of the feature to the physical property of the polymer selected from the group consisting of temperature, crystallinity, applied stress, and crystalline orientational state.

37. A probe for measuring a Raman spectrum of a sample, comprising:

a housing;

a first optical system for collimating an illumination beam along a first direction, the first optical system being attached to the housing;

a first optical filter being located along the first direction and being adapted to produce substantially monochromatic light from light incident thereupon, the first optical filter being insertable into the probe without substantially affecting an alignment between the probe and the sample;

a second optical system for substantially focusing a portion of the light from the first optical filter on the sample and for collimating a portion of scattered light from the sample along a second direction, the second optical system being attached to the housing; and a third optical system for substantially focusing a portion of the scattered light from the second direction onto an aperture, the third optical system being attached to the housing.

38. The probe as set forth in claim 37, further comprising a beam splitter for reflecting a portion of the light from the first optical system towards the second optical system and for transmitting a portion of the scattered light from the second optical system in the second direction, the beam splitter being attached to the housing.

39. The probe as set forth in claim 38, further comprising a notch filter located along the second direction and connected to the housing, the notch filter for receiving a portion of the light transmitted by said beam splitter.

40. The probe as set forth in claim 39, wherein the notch filter is insertable into the housing without substantially affecting the alignment between the probe and the sample.

41. The probe as set forth in claim 38, wherein the beam splitter is slidably removable from an optical path between the second optical system and the third optical system.

42. The probe as set forth in claim 37, wherein the first optical system is fixed to the housing by a micro-positioner, the micro-positioner enabling adjustment of at least one internal alignment of the first optical system.

43. The probe as set forth in claim 42, wherein the micro-positioner includes at least one micrometer thread.

44. The probe as set forth in claim 37, further comprising a polarization analyzer located along the second direction.

45. The probe as set forth in claim 44, wherein the polarization analyzer is insertable into the housing without substantially affecting the alignment between the probe and the sample.

46. The probe as set forth in claim 37, wherein the third optical system is fixed to the housing by at least one micro-positioner the micro-positioner, enabling an adjustment of at least one internal alignment of the third optical system.

47. The probe as set forth in claim 46, wherein the micro-positioner includes at least one micrometer thread.

48. The probe as set forth in claim 37, further comprising a closed circuit television camera for receiving a portion of the light from along the second direction.

49. An apparatus for taking a Raman spectrum of a sample, comprising:

an optical bench setup including a substantially monochromatic light source and a spectrum analyzing system;

a delivery fiber having first and second ends, the first end coupling to the substantially monochromatic light source;

a remote probe for illuminating the sample with a portion of light from the source and for receiving a portion of light scattered by the sample, the remote probe having a housing, an optical input port and an optical output port, the delivery fiber connected to the optical input port;

a filter to attenuate a portion of the frequencies of light excited by said delivery fiber, said filter slidably insertable into said housing; and a collection fiber having third and fourth ends, the third end coupling to the optical output port and the fourth end coupling to the spectrum analyzing system.

50. The apparatus as set forth in claim 49, wherein the remote probe includes:

first, second and third optical systems attached to the housing, the first optical system for collimating a portion of the light from the second end of the delivery fiber into a first direction, the second optical system for focusing a portion of the collimated light from the first optical system on the sample and for collimating a portion of light scattered by the sample into a second direction, the third optical system for focusing a portion of the light from the second direction onto the third end of the collection optical fiber;

a beam splitter for reflecting a portion of the collimated light arriving along the first direction towards the second optical system and for transmitting a portion of the light arriving along the second direction towards the third optical system, the beam splitter being attached to the housing.

51. The apparatus as set forth in claim 49, further comprising a notch filter connected to the housing, the notch filter for receiving a portion of the light scattered by the sample and for transmitting a portion of the light therefrom to the third end of the collection fiber.

52. The apparatus as set forth in claim 51, wherein the notch filter is insertable into the housing without substantially affecting an alignment between the probe and the sample.

53. The apparatus as set forth in claim 50, wherein the beam splitter is slidably removable from an optical path between the second optical system and the third optical system.

54. The apparatus as set forth in claim 50, wherein the first optical system is fixed to the housing by at least one micro-positioner, the micro-positioner enabling adjustment of an internal alignment of the first optical system.

55. The apparatus as set forth in claim 49, further comprising a polarization analyzer attached to the housing, the polarization analyzer for receiving a portion of the light scattered by the sample and for transmitting a portion of the portion of the light received to the collection fiber.

56. The apparatus as set forth in claim 55, wherein the polarization analyzer is insertable into the remote probe without substantially affecting the alignment between the probe and the sample.

57. The apparatus as set forth in claim 49, wherein the third optical system is fixed to the remote probe by at least one micro-positioner, the micro-positioner enabling an adjustment of at least one internal alignment.

58. The apparatus as set forth in claim 49, wherein the probe is positioned to illuminate the sample, the sample being a polymer under manufacture.

59. The apparatus as set forth in claim 58, wherein the probe is situated to illuminate the polymer sample in a quench chamber.

60. A probe for measuring a Raman spectrum of a sample, comprising:

a housing;

a first optical system adapted to collimating light from a first aperture along a first direction, the first optical system being attached to the housing;

a first optical filter being adapted to produce substantially monochromatic light from the light received from the first optical system;

means for removably fixing the first optical filter to the housing along the first direction;

a second optical system for focusing a portion of the light from the first optical filter onto the sample and for collimating a portion of scattered light from the sample along a second direction, the second optical system being attached to the housing; and a third optical system adapted to focusing light onto an end of a second aperture, the third optical system being attached to the housing.

61. The remote probe as set forth in claim 60, further comprising means for adjustably fixing the first optical system to the housing.

62. The remote probe as set forth in claim 60, further comprising means for adjustably fixing the third optical system to the housing.

63. A method for measuring a Raman spectrum of a sample with a probe, comprising:

aligning the probe to focus illuminating light on the sample;

then, sliding a first filter into the probe without substantially changing the alignment, the first filter making the illumination light substantially monochromatic;

illuminating the sample with substantially monochromatic light;

collecting a portion of light scattered by the sample; and analyzing a portion of the Raman spectrum of a portion of the light collected.

64. The method as set forth in claim 63, further comprising analyzing the polarization of the light collected.

65. The method as set forth in claim 63, further comprising:

sliding a second filter into the probe without substantially changing the alignment, the second filter attenuating a portion of the scattered light.

66. The method as set forth in claim 63, further comprising aligning first and second lens systems attached to the probe before sliding the first filter into the probe.

67. The method as set forth in claim 66, wherein the act of aligning includes turning positioning screws of a micro-positioner, the micro-positioner fixing the first lens system to the housing.

* * * * *

UNITED STATES PATENT AND TRADEMARK OFFICE
CERTIFICATE OF CORRECTION

PATENT NO.    :  5,999,255

DATED         :  December 7, 1999

INVENTOR(S)   :  James D. Dupée and David L. Davidson

It is certified that error appears in the above-identified patent and that said Letters Patent is hereby corrected as shown below:

Col. 3, line 8 insert after "wavelengths," -- e.g., wavelengths--

Col. 6, line 45, delete "1 12" and insert --112--

Col. 6, line 66, delete "213" and insert -- 2B--

Signed and Sealed this

Sixteenth Day of May, 2000

Attest:

Q. TODD DICKINSON

Attesting Officer

Director of Patents and Trademarks